US011292164B2

(12) United States Patent
Romanov et al.

(10) Patent No.: US 11,292,164 B2
(45) Date of Patent: Apr. 5, 2022

(54) METHOD FOR CONTROLLING A STEP OF A PROCESS AUTOMATICALLY CARRIED OUT USING A MACHINE AND A METHOD FOR PRODUCING A PARTICLE FOAM PART

(71) Applicant: Kurtz GmbH, Kreuzwertheim (DE)

(72) Inventors: Victor Romanov, Wertheim (DE); Constantin Kemmer, Marktheidenfeld (DE); Maximilian Kurtz, Nuremberg (DE); Norbert Reuber, Bergrothenfels (DE)

(73) Assignee: Kurtz GmbH, Kreuzwertheim (DE)

( * ) Notice: Subject to any disclaimer, the term of this patent is extended or adjusted under 35 U.S.C. 154(b) by 1009 days.

(21) Appl. No.: 15/528,466

(22) PCT Filed: Nov. 25, 2015

(86) PCT No.: PCT/EP2015/077668
§ 371 (c)(1),
(2) Date: May 19, 2017

(87) PCT Pub. No.: WO2016/083464
PCT Pub. Date: Jun. 2, 2016

(65) Prior Publication Data
US 2017/0312953 A1 Nov. 2, 2017

(30) Foreign Application Priority Data

Nov. 26, 2014 (DE) ............ 10 2014 117 332.5

(51) Int. Cl.
*B29C 44/60* (2006.01)
*B29C 44/34* (2006.01)
(Continued)

(52) U.S. Cl.
CPC ............ *B29C 44/60* (2013.01); *B29C 39/36* (2013.01); *B29C 44/3415* (2013.01);
(Continued)

(58) Field of Classification Search
CPC .......................... B29C 44/60; B29C 44/3415
See application file for complete search history.

(56) References Cited

U.S. PATENT DOCUMENTS 4,615,849 A * 10/1986 Hahn .................. B29C 44/60
264/40.4
4,822,542 A * 4/1989 Kuwabara ......... B29C 44/3461
264/37.29

(Continued)

FOREIGN PATENT DOCUMENTS

AT 500271 A1 11/2005
CH 668033 A5 11/1988

(Continued)

OTHER PUBLICATIONS

German Search Report, dated Mar. 2, 2015, from German Application No. DE 10 2014 117 332.5, filed on Nov. 26, 2014. German. Six pages.

(Continued)

*Primary Examiner* — Armand Melendez
(74) *Attorney, Agent, or Firm* — HoustonHogle LLP

(57) ABSTRACT

The present invention relates to a method of controlling a step of a process carried out by a machine. The invention is characterized in that a sensor is used to measure a variable characteristic with an exponential course for a step, and with the aid of several consecutive measurements of the characteristic variable a time constant of the exponential change is determined, and the step is ended after it has been carried out for a period of time corresponding to a predetermined multiple of the time constant.

25 Claims, 9 Drawing Sheets

Figure 1:
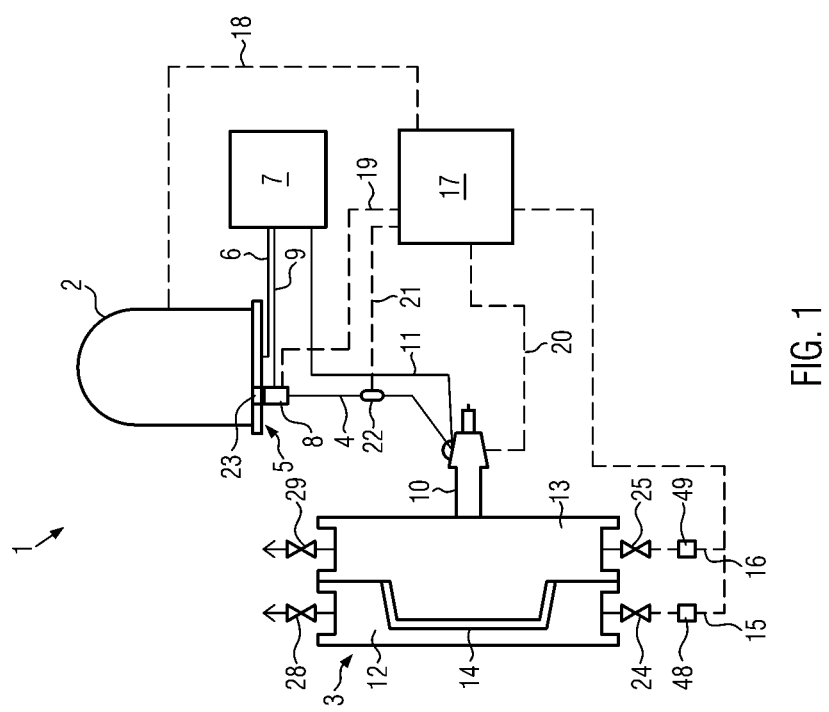

(51) Int. Cl.
    *B29C 39/36*     (2006.01)
    *B29K 23/00*     (2006.01)
    *B29K 25/00*     (2006.01)
    *B29K 67/00*     (2006.01)
    *B29K 75/00*     (2006.01)
    *B29K 79/00*     (2006.01)

(52) U.S. Cl.
    CPC ...... *B29K 2023/06* (2013.01); *B29K 2023/12* (2013.01); *B29K 2025/06* (2013.01); *B29K 2067/046* (2013.01); *B29K 2075/00* (2013.01); *B29K 2079/08* (2013.01)

(56) References Cited

U.S. PATENT DOCUMENTS

| | | | |
|---|---|---|---|
| 6,220,842 | B1 | 4/2001 | Kamiyama et al. |
| 6,312,628 | B1* | 11/2001 | Wieder ............... B29C 45/7306 264/328.16 |
| 6,383,608 | B1* | 5/2002 | Burkett ............... B29C 44/1266 264/45.1 |
| 6,454,553 | B1* | 9/2002 | Zobel ................. B29C 44/3419 425/4 R |
| 2004/0010068 | A1* | 1/2004 | Doren ................. B29C 35/0288 524/445 |
| 2008/0036105 | A1* | 2/2008 | Campanelli ...... B29D 11/00317 264/1.38 |
| 2012/0251647 | A1* | 10/2012 | Aylmore ............... B29C 43/203 425/149 |
| 2014/0243442 | A1* | 8/2014 | Coles .................... B29C 44/445 521/143 |

FOREIGN PATENT DOCUMENTS

| | | |
|---|---|---|
| DE | 1 243 123 B | 6/1967 |
| DE | 1 704 984 A1 | 2/1972 |
| DE | 3 243 632 A1 | 5/1984 |
| DE | 3541258 C1 | 1/1987 |
| DE | 196 37 349 A1 | 4/1997 |
| DE | 19637347 A1 | 4/1997 |
| DE | 202004003679 U1 | 5/2004 |
| EP | 0 192 054 A2 | 8/1986 |
| EP | 0 224 103 A2 | 6/1987 |
| EP | 0485714 A1 | 5/1992 |
| EP | 1813408 A1 | 8/2007 |
| JP | S60112430 A | 6/1985 |
| JP | 2001341149 A | 12/2001 |
| WO | 9420568 A1 | 9/1994 |
| WO | 2010/010010 A1 | 1/2010 |
| WO | 2012/065926 A1 | 5/2012 |
| WO | 2013/013784 A1 | 1/2013 |
| WO | 2013/182555 A1 | 12/2013 |
| WO | 2014/011537 A1 | 1/2014 |
| WO | 2014/128214 A1 | 8/2014 |

OTHER PUBLICATIONS

International Search Report and Written Opinion of the International Searching Authority, dated Feb. 26, 2016, from International Application No. PCT/EP2015/077668, filed on Nov. 25, 2015. German with English translation of Search Report. Thirteen pages.
International Preliminary Report on Patentability and Written Opinion of the International Searching Authority, dated May 30, 2017, from International Application No. PCT/EP2015/077668. German original and English translation. Fourteen pages.

\* cited by examiner

| Measured parameter | | Change in setting parameter |
|---|---|---|
| Weight | weight of PST too low | increase material tank pressure<br>increase filling air pressure<br>increase fluidising air<br>extend filling time<br>increase crack gap<br>increase water volume during filling |
| | weight of PST too high | reduce material tank pressure<br>reduce filling pressure<br>reduce fluidising air<br>reduce filling time<br>reduce water volume during filling<br>reduce crack gap |
| Contour/shape | incomplete PST | clean filling injector (blow back)<br>open/close filler |
| | convex | shorten stabilisation and/or autoclaving and/or extend cooling |
| | concave | extend stabilisation and/or autoclaving and/or shorten cooling |
| Dimensions | PST too small | reduce cooling time |
| | PST too large | extend cooling time |
| Surface structure | PST surface has holes, imperfections, craters | increase filling pressure<br>extend drainage time<br>reduce water volume<br>reduce cooling time |

Fig. 4a

| | | | | |
|---|---|---|---|---|
| Strength and/or permeability | welding of the PST good outside and poor inside | reduce cross steaming pressure reduce cross steaming time | | |
| | | increase crack gap steaming time | | |
| | welding of the PST good inside and poor outside | increase autoclaving steam time | | |
| | | increase autoclaving steam pressure increase autoclaving steam time | | |
| | | increase autoclaving steam pressure | | |
| Surface structure with internal welding | molten surface with good internal welding | reduce autoclaving steaming time | | |
| | | reduce autoclaving steaming pressure | | |
| | | reduce autoclaving steaming time reduce autoclaving steaming pressure | + | |
| | molten surface with poor internal welding | reduce cross steaming pressure | | reduce autoclaving steaming time |
| | | reduce cross steaming time reduce cross steaming pressure | | reduce autoclaving steaming time reduce autoclaving steaming pressure |
| | | | | reduce autoclaving steaming pressure |

Fig. 4b

METHOD FOR CONTROLLING A STEP OF A PROCESS AUTOMATICALLY CARRIED OUT USING A MACHINE AND A METHOD FOR PRODUCING A PARTICLE FOAM PART

RELATED APPLICATIONS

This application is a § 371 National Phase Application of International Application No. PCT/EP2015/077668, filed on Nov. 25, 2015, which claims priority to German Application No. 10 2014 117 332.5, filed on Nov. 26, 2014, both of which are incorporated herein by reference in their entirety.

The present invention relates to a method of controlling a step of a process automatically carried out by a machine and a method of producing a particle foam part.

Particle foam parts based on thermoplastic polyurethane are known from WO 94/20568. These particle-foam parts are made from expandable particle-shaped thermoplastic polyurethanes. For molded part production, the pre-expanded, where applicable pressure-charged thermoplastic polyurethane particles are placed in a heatable mold, and heated sufficiently for the particles to become welded together. The heating is effected through the application of steam. If necessary, the particles may be pressure-charged before molded part production. After demolding, the part should be conditioned until it has reached a constant weight. Conditioning takes place at temperatures of 20-120° C. The thermoplastic polyurethane particles may be provided with a blowing agent, such as, for example, butane or CO2. Solid blowing agents may also be used, which split off gas under heating, such as azocarbonamide or toluene-p-sulphonic acid hydracite.

Known from WO 2014/011537 A1 is a method for the production of shoe soles from thermoplastic polyurethane foam particles. Other methods of producing particle-foam parts are disclosed in DE 1 243 123 A, DE 1 704 984 A, U.S. Pat. Nos. 4,822,542 and 6,220,842 B1.

The advantage of particle-foam parts made of particles based on thermoplastic polyurethane (TPU particles) lies in their high elasticity in comparison with particle-foam parts based on other plastics, in particular polystyrol and polypropylene.

Great efforts have therefore been made to make such particle-foam parts based on polyurethane accessible to mass production. In particular such particle foams based on polyurethane are, because of their mechanical properties, of very great interest for shoe soles.

The manufacture of soles for shoes from foamed particles of thermoplastic polyurethane is also disclosed in WO 2012/065926 A1. Here the foamed polyurethane particles are embedded in a matrix material made of polyurethane foam, thus creating a hybrid material. Because of the properties of the foamed polyurethane particles, the soles have good damping properties, may be bent with minimal force, and have high rebound resilience.

Described in WO 2013/013784 A1 is a further method for the manufacture of a sole or a part of a sole of a shoe, in which the sole is made of foamed thermoplastic polyurethane based on urethane (TPU, E-TPU, TPE-U) and/or on the basis of polyether-block-amide (PEBA). The foam particles are preferably linked by a binder. As binder, a two-component polyurethane system is used.

Disclosed in WO 2010/010010 A1 are expandable thermoplastic polymer blends containing a blowing agent, also thermoplastic polyurethane (TPU) and styrene polymer. The preferred percentages by weight of thermoplastic polyurethane lie between 5 and 95 and the percentages by weight of styrene polymer between 5 and 95, with the percentages by weight of thermoplastic polyurethane and styrene polymer adding up to 100 parts. The polymer blend may contain a further thermoplastic polymer.

Known from WO 2013/182555 A1 is a method of producing a particle-foam part from thermoplastic polyurethane particles, in which the foam particles are wetted in water containing lubricant for conveyance in a gas flow. This is intended to prevent the particles from sticking together during movement. The foam particles are sprayed with water by nozzles.

Described in WO 2014/128214 A1 is a method and an apparatus for the production of a particle foam part in which the foam particles are fed from a material container by means of a pipe to a mold, wherein steam is added to the foam particles to be supplied.

DE 196 37 349 A1 discloses an apparatus for the sintering of foamable plastic material. The plastic material used is pre-expanded polystyrol, which is fed from a supply tank to a sinter chamber. A sinter chamber is surrounded by several steam chambers. Using sensors, the temperature at the sinter chamber prevailing in the area of each individual steam chamber, the foaming pressure prevailing there, and the steam pressure in the sinter chamber are detected and passed on to a controller. The temperature, foaming pressure and steam pressure of each individual steam chamber should here be so controlled that, on reaching a target value, this target value should be held constant within relatively narrow limits, by suitable variation of the steam supply to the associated steam chamber. If all steam chambers have reached their target values for temperature and for steam pressure, or if a maximum time has elapsed, then the steam chambers are cooled so that the foamed plastic part solidifies.

Described in EP 224 103 B1 is an adaptive control process for the foaming and sintering of plastic bodies made of pre-expanded plastic material. The sintering apparatus has a sinter chamber which is surrounded by two steam chambers, to which it is connected by a multiplicity of nozzles. The sintering apparatus is provided with a multiplicity of pressure and temperature sensors in the area of the flow passages, the steam chambers, the steam generator and a vacuum generator. In addition, the plastic parts produced in the sintering process may be fed to a quality measurement process. The quality parameters are molding accuracy, moisture content, bending strength and surface roughness or strength. With the aid of the quality parameters and the process of statistical variation of the control criteria, these factors may be set automatically at the optimum level.

DE 32 43 632 A1 relates to a method and an apparatus for the sintering of particle foam bodies. With this method it should be possible to produce different moldings from diverse foamable plastics. Since the materials on delivery are subject to considerable tolerances, differing e.g. in moisture and blowing gas content depending on pre-foaming and interim storage, characteristic values are determined during processing from measured temperature and pressure values. These are used for ongoing determination of default values or for their correction. The characteristic values and the new default values are at the same time compared with preset material-specific limit values and/or mean values, and overshoots or deviations are passed on to the material supply as an alarm or control signal. This should make it possible for the operating control system to compensate for tolerances in material properties, also fluctuations in the states of other media supplied and the different states of the mold in start-up and continuous operation, so that moldings with largely identical molded part properties are obtained. The preset characteristic values correspond to a specific density, strength, maximum moisture content and accuracy of shape. The process time, moreover, should not be unnecessarily extended and energy consumption not increased by an extreme amount. Measuring devices are provided for detecting molded part properties of the finished moldings, with this measured data serving for feedback and comparison with the preset molded part properties. From the comparison of results, a correction of the process operation is made, to the extent that unacceptable deviations occur. In this way the process is self-optimized.

In an apparatus known from EP 192 054 B, a softening point of the plastic is determined from a pressure and temperature curve in the sinter chamber. From this softening point and an associated sintering pressure or sintering temperature, a maximum demolding temperature is determined, below which the plastic part may be removed from the mold. This makes possible an especially rapid process sequence.

EP 1 813 408 A1 discloses a method for the filling of molds with expanded polymer particles. Here it is provided that a filling device or a feed for a particle-carrier gas mixture attached to it is provided with at least one measuring device for the flow direction or the temperature of a polymer-particle-carrier gas mixture. The measuring device may be a flow sensor or a temperature sensor. The measuring device may also be connected to an automatic controller in such a way that, depending on the signal received from the measuring device, the supply of particle-carrier gas mixture and where applicable steam is interrupted and where applicable an injector gas feed for rinsing the pipes is opened. In addition, the filling device is able to terminate supply of the polymer-particle-carrier gas mixture as soon as the measuring devices indicate that the mold is filled with polymer particles.

Described in DE 35 41 258 C1 is an adaptive control method for the foaming and sintering of plastic. A sintering apparatus for carrying out this adaptive control method is said to have several sensors for various parameters. According to this method it is provided that the injection molding process is terminated when a pressure measured value at an injector pressure sensor has risen by a preset value as compared with a pressure measured value measured shortly before the start of injecting. Heating should be terminated when condensate temperatures at temperature sensors lie above a preset condensate temperature. Cross steaming should be terminated when a differential pressure has reached a specific preset value. Sintering should be terminated when the differential pressure during the sintering period has exceeded a maximum or a specific preset value or a chamber pressure has exceeded a specific value, after which a predetermined time has elapsed. Consequently, with this method, two different control criteria are critical, namely the pressure criterion and a time criterion. According to an alternative embodiment, the end of the sintering phase may also be determined from a differential temperature, followed by a waiting time based on a time criterion. It should also be possible though this maximum to obtain a specific sintering state largely irrespective of the molding of the material used. Consequently, probably all phase times are limited by suitable preset maximum times so that e.g., in the case of a sensor failing, the process still continues.

JP 2001-341 149 A1 discloses a method for the molding of resin. According to this method it is provided that the mold pressure of the particles during foaming, when heated up, and a steam pressure, are detected in such a way that the detected values correspond to the previously defined optimal foam pressure curve. This is realized by means of suitable pressure sensors mounted in an ejector pin.

The invention is based on the problem of controlling a step of a method executed automatically by a machine in such a way that the step is optimally controlled in respect of the efficiency and also the precision of the method.

A further problem of the invention is to control a step of a production process implemented automatically by a machine in such a way that the step may be executed optimally in respect of the efficiency of the production process and also the quality of a product to be made by the production process.

A further problem of the present invention is to create a method for the production of a particle foam part, by which a very efficient production of the particle foam parts is obtained.

A further problem of the present invention is to create a method and an apparatus for the production of a particle foam part, by which particle foam parts of high quality may be produced.

A further problem of the present invention is to create a method and an apparatus for the production of a particle foam part, by which particle foam parts of different size and/or different shape may be produced reliably.

A further problem of the present invention is to create a method and an apparatus for the production of a particle foam part which eliminates one or more of the disadvantages of the prior art.

One or more of the problems is or are solved by a method according to the independent claims. Advantageous developments are set out in the relevant dependent claims.

The method of controlling a step of a process automatically carried out by a machine is characterized in that a sensor is used to measure for a step a characteristic variable which has an exponential course and, with the aid of several consecutive measurements of the characteristic variable, the time constant of the exponential variation is determined, and the step is terminated after it has been implemented for a period of time corresponding to a predetermined multiple of the time constant.

In the method according to the invention, a step of a process is controlled with the aid of a characteristic variable. The characteristic variable describes an important state of the machine, a product to be produced or worked by the machine, or a physical state to be influenced by the machine, wherein the characteristic variable correlates in particular with a final state which is to be achieved by execution of the step. The characteristic variable also has the property of varying exponentially during the process. The variation of the characteristic variable can often be very different. If the characteristic variable is a temperature, then its pattern may depend for example on the room temperature of the room in which the machine is located. It can also depend on the nature and the quality of materials to be processed.

The course of change of the characteristic variable may also depend for example on the volume of a product to be produced.

The inventors of the present invention have recognized that, by determining the time constant of an exponential change in the characteristic variable, the duration of a step to be executed automatically by a machine may be set individually in such a way that the target condition is always correctly maintained. By this means the step is executed optimally in respect of the result to be obtained hereby. On the other hand, by using the time constant to set the duration of the step, the step itself is executed only for as long as necessary. This means that the duration is set so that the desired objective is achieved, but not longer. In this way, the step is executed efficiently in terms of time. The operating time of a machine causes costs to be incurred. These costs are minimized through the efficient execution of the step in time. The whole process is hereby optimized for time.

The method may include a casting process with the following steps:
filling of the mold cavity with a material to be solidified
cooling of the mold cavity (stabilization step)
demolding of the mold cavity.

During the stabilization step, the mold cavity and/or the part body may be cooled, for example by feeding cooling water or cooling air into the cooling passages formed in the mold.

The characteristic variable of the stabilization step may be the temperature in the mold cavity or the temperature of the mold.

The process may be a production process for the production of a specific product. The process may however also be a machining process for modifying an already existing product and bringing it into a desired state, using a machine.

The process may for example also be the air conditioning of a room, such as for example the passenger compartment of a motor vehicle. The air conditioning of the passenger compartment of a motor vehicle is extremely complex and depends on many parameters (solar radiation, available waste heat of an internal combustion engine, etc.). On the other hand, one would like to set as quickly as possible a certain target temperature in the motor vehicle, without causing any excessive variations in the process. As characteristic variable, a temperature in the passenger compartment is detected, which may involve one or more sensors.

The flow rate of a conditioned airflow into the passenger compartment is controlled on the basis of the variation of the temperature of the passenger compartment.

The method may be provided for the production of particle foam parts, comprising the following steps:
filling of a mold cavity with foam particles
welding of the foam particles to form a particle foam part
demolding of the mold cavity, wherein the mold cavity is opened and the particle foam part removed.

According to one aspect, the invention is characterized in that a sensor is used to measure a variable which is characteristic for a step or a sub-step. This variable has an exponential course wherein, with the aid of several consecutive measurements of the characteristic variable, the time constant of the exponential variations is determined and the step is ended after implementation for a period of time corresponding to a predetermined multiple of the time constant.

With this method, therefore, the period of time for which the step or sub-step of the method is conducted is determined individually. This invention is based on the finding that a characteristic variable which varies according to an exponential pattern, first of all varies strongly and then gradually approaches a target or final state. After a certain multiple of the sub-step it is ensured that the characteristic variable has approached a certain low percentage portion of the target value. The target value is the value which the characteristic variable would assume if the step were carried out for an indefinite time. The target value may therefore also be described as the final state.

Figure 5:
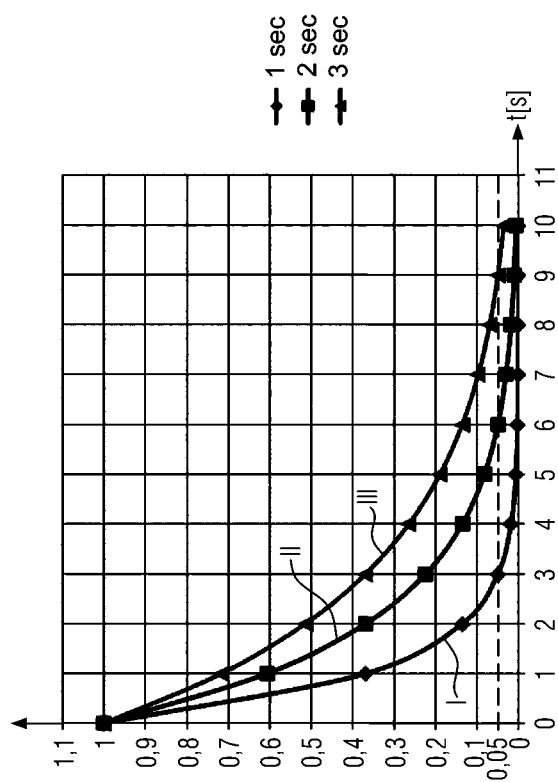

FIG. 5 shows three exponential falling curves I, II and III wherein for these three curves, according to the formula given above, K=1 and C=0, for which reason the initial state is 1 and the final state is 0. Curve I has a time constant T of 1 s, curve II a time constant T of 2 s, and curve 3 a time constant T of 3 s. The time in seconds is plotted on the abscissa and the ordinate shows any desired measured variable. All three curves thus begin at time point 0 with value 1. After 3T the value is in each case 0.05, i.e. it has reduced by 95% and is now only 5% from the final state, which is here 0.

This step or sub-step of the method is conducted until the characteristic variable is sufficiently close to the target value. In this way it is ensured that this step or sub-step is achieved to an adequate extent. On the other hand, this step or sub-step is executed no longer than the period of time which corresponds to the predetermined multiple of the time constants, so that this step or sub-step is not drawn out unnecessarily. By this means, as compared to conventional methods in which the duration of a step or sub-step is set at a fixed value, considerable time is saved and the entire process is made more efficient.

A further benefit of this method is that the target value need not be set explicitly. This follows automatically from the fact that the characteristic variable changes with an exponential pattern. It is therefore unnecessary, on setting up the system, to specify a target value in advance.

A further benefit of this method lies in the fact that, with certain steps or sub-steps of the method, certain properties of the material to be processed vary, with this variation of properties depending on the duration for which this step or sub-step is applied. As an example of this method, the control of a cross steaming operation, in which steam consumption is used as characteristic variable, is described below. In the course of cross steaming, on account of the increasing welding of the foam particles, permeability or porosity increases with increasing duration of the cross steaming process. Through the control of cross steaming duration by determining the time constant of steam consumption it is ensured that, at the end of the cross steaming step, porosity or permeability of the particle foam part is always the same. In this way and with this method, the production of foam particle parts of varying size or varying thickness may be controlled automatically without the need to determine and set duration on an individual basis. Consequently, in one machine, the mold may be interchanged for different particle foam parts, without the need for manual adjustment of the duration of the process step of cross steaming, while particle foam parts of consistent quality are obtained.

Typically the predetermined multiple of the time constants lies at around two to four times.

The pressure and/or the temperature in the mold cavity may be used as characteristic variable. This applies in particular to welding, with the sub-steps autoclaving, secondary steaming (optional), cooling and stabilization. In addition, steam consumption may be used as characteristic variable for cross steaming.

An exponential course of characteristic variable G is described by the following formula:

$$G = K \cdot e^{\frac{t_0 - t}{\tau}} + C,$$

in which t stands for time, $t_0$ for start time, K for a constant, C for a further constant and T is the time constant. The initial state is K+C and the final state is C. K may be both positive and negative, so that G may approach the final state C from above or from below.

The time constant T may be determined with the aid of at least three values of G measured at different times t. Time constant T may be determined using the Levenberg-Marquardt algorithm.

In addition, the foam particles may be subjected to pressure-charging in a supply tank. This means that the gas pressure in the supply tank in which the foam particles are held is increased. By this means, the foam particles are initially compressed. The gas diffuses in the foam particles, which are also described as beads, so that the foam particles expand once again. This expansion is measured. Measurement of the expansion may be ascertained from the filling state of the supply tank. This is therefore a suitable variable to describe the average size of the foam particles. This average size of the foam particles may be used as characteristic variable, with the pressure-charging being terminated for example after two to four times the time constant. By using as characteristic variable a variable suitable for describing the average size of the foam particles it is possible to subject any desired amount of foam particles to pressure-charging, without the need for any manual intervention.

During stabilization, the mold and/or the particle foam bodies are cooled.

The cross steaming is a sub-step of welding in which steam is fed to the foam particles. Here the steam is introduced at one side of the mold and removed at the other side so that air to be found in spandrels between the foam particles is displaced from the mold. For cross steaming, the pressure or the temperature in the mold cavity may also be used as characteristic variable.

According to a further aspect of the present invention, the method for the production of particle foam parts is characterized in that the foam particles are drawn intermittently from a material container.

Due to the intermittent withdrawal of foam particles, bridges between the foam particles which have formed in the material container are broken up and the foam particles separated. This method is especially advantageous for foam particles with an adhesive surface, e.g. eTPU foam particles.

For the intermittent withdrawal of foam particles from the material container, an orifice of the material container may be opened and closed consecutively and/or the air for conveying the foam particles in the pipe may be supplied intermittently.

According to a further aspect of the present invention, a method for the production of particle foam parts is provided in which, at the start of feeding steam into the mold, the mold parts
are spaced a short distance apart (crack gap) and then the two mold parts are moved together, causing the foam particles to be compressed. This method is characterized in that two mold parts are used which, even when spaced apart, are sealed relative to one another. Since the mold, even in the presence of a crack gap, has a substantially gastight seal at its periphery, the air in the spandrels between the foam particles is very efficiently forced through the steam. Since the mold is set with a crack gap, the spandrels are relative large, so that the flow resistance is low and a much faster displacement of air is obtained than would be the case with a completely closed mold. Due to the sealing at the peripheral circumference, the steam does not escape at the side of the mold, but instead flows from one side of the mold to the other side (cross steaming), ensuring that the air is forced out of all the spandrels.

According to a further aspect of the present invention, a method for the production of particle foam parts is provided, which is characterized in that, within a cycle at regular intervals, measured parameters such as temperature and/or pressure in the mold cavity, temperature of a mold bounding the mold cavity, pressure and/or temperature and/or flow volume of steam or condensate supplied or removed, valve positions, flow volume of the compressed air used in filling, are recorded and, with the aid of the recorded measured parameters, one or more predetermined setting parameters are set within the same cycle.

It is true that, in conventional methods for the production of particle foam parts, a multiplicity of measured parameters has in the past been recorded. However, it has been assumed that it is sufficient to record the individual measured parameters once per cycle or a few times per cycle. This is also correct, so long as a multiplicity of identical particle foam parts is being produced. This applies especially if the material used is expanded polystyrol (ePS), expanded polypropylene (ePP) or expanded polyethylene (ePE) which, in comparison with expanded polyurethane are much more easily processed. If, however, it is desired to produce particle foam parts of differing size either in parallel with different molds or sequentially, and in this connection in particular polyurethane-based foam particles are used, then the processes are often unstable. Through the recording of a multiplicity of measured parameters at regular intervals, the process may be controlled much more precisely and reaction can be made within a cycle so that, with this data, distinctly greater flexibility in respect of the shape and size of the particle foam parts and also in respect of the material to be used is obtained. The measured parameters are preferably recorded at intervals of no longer than 10 s and in particular no longer than 5 s or no longer than 2 s. An example of a reaction within a cycle with the aid of several measured parameters measured in the cycle is the determination of the time constant described above. In determining the dissipation over time of the foam pressure in order to terminate secondary steaming, when the variation of foam pressure falls below a predetermined value, represents a reaction within a cycle which requires several measured values within this cycle. A further example of a reaction within a cycle is the automatic termination of cooling when the foam pressure falls below a predetermined threshold and is roughly constant, or the second dissipation of the foam pressure has overshot a zero point and the first dissipation lies below a threshold.

With this method, especially, the duration of the individual steps is set automatically.

According to a further aspect of the present invention, a method for the production of particle foam parts is provided in which one or more measured parameters of the demolded particle foam part are measured and, with the aid of the recorded measured parameters, one or more predetermined setting parameters are set.

By this means, therefore, an automatic feedback into the production process of the measured parameters recorded for the finished particle foam part is created. This ensures that the foam particle parts are produced with consistent quality, making the process substantially more stable.

The measured parameters measured for the demolded particle foam part are e.g., the measured parameters describing surface, in particular measured parameters by which imperfections in the particle foam part may be detected. Other parameters detectable on the demolded particle foam part are weight, size, strength and porosity.

With these measured parameters detected on the demolded particle foam part, preferably the duration of individual steps or sub-steps of the production process and/or a predetermined pressure and/or a prescribed temperature are set automatically.

If the detectable parameter on the demolded particle foam part is its weight, then preferably depending on the weight, the width of a crack gap in filling the mold cavity with foam particles to produce a further particle foam part is set on the basis of the measured weight. If the measured weight is greater than a target weight, then the crack gap is correspondingly reduced and if the measured weight is less than the target weight, then the crack gap is correspondingly enlarged. By setting the crack gap, the amount of foam particles fed to the mold cavity may be adjusted.

This is preferably of advantage in using polyurethane-based foam particles, since here even a slight deviation in quantity from a target quantity of foam particles may lead to considerable differences in quality.

In addition, a geometrical shape may be detected as a measured parameter of demolded particle foam parts. In particular, the course of a specific surface or edge may be considered as such a geometrical shape. The surface has a certain desired pattern, which may be concave, flat or convex in shape, or may have corresponding different sections. If the measured geometrical shape is more convex than a specified shape, then the individual foam particles have been too strongly expanded. The expansion of the foam particles may be influenced by the duration of stabilization, autoclaving and/or cooling. If too much expansion is detected through the measured geometrical shape, then the stabilization and/or autoclaving should be shortened or the cooling lengthened.

In filling, in the method described above, foam particles are conveyed into the mold cavity via a conveyor line using compressed air, with the conveyor line being blown free after the mold cavity has been filled completely.

Welding of the foam particles comprises preferably the following steps: rinsing of steam chambers
cross steaming of the mold cavity, wherein the cross steaming may be divided into at least two sub-steps, in which the steam is passed through the mold cavity in opposite directions (=first cross steaming and second cross steaming)
autoclaving of the foam particles, in which they are subjected to steam. In addition, welding of the foam particles may include secondary steaming (optional), cooling of the mold and of the particle foam part, stabilization (optional).

At the end of welding and before demolding of the particle foam part, the latter may be stabilized by means of spraying cooling water into the mold cavity and/or
applying a partial vacuum to the mold cavity and/or
temporarily compressing the particle foam part using compressed air and/or
keeping the particle foam part in the mold cavity for a predetermined period of time.

Stabilization ensures that the walls of the foam particles of the particle foam part do not undergo plastic deformation, or else only slightly, during demolding. Through stabilization, the pressure within the foam particles is reduced sufficiently that it no longer significantly expands the foam particles during release of the particle foam part from the mold halves of the mold.

Preferably after demolding, a mold bounding the mold cavity and/or a quill located in a filling injector are cleaned by passing compressed air through them.

According to a further aspect of the present invention, a method for the production of particle foam parts is provided which is characterized in that a mold with a heating device and bounding the mold cavity is set at a predetermined temperature between each cyclical repetition of the production process.

Because of the conditioning of the mold by means of a heating device it is not necessary to condition the mold using steam, so that the step of rinsing the steam chambers is shortened and the efficiency of the process may thereby be enhanced. Moreover, the temperature of the mold may be set more quickly and more precisely and in particular at a higher temperature so that, on steaming the foam particles in the mold cavity, little heat is drawn from the steam as it enters the mold cavity, and a better heat input is obtained.

According to a further aspect of the present invention, a method for the production of particle foam parts is provided in which, after welding of the foam particles and before demolding of the particle foam part, a process medium such as e.g. compressed air or steam is fed through the mold cavity and the flow volume is measured so that, with the aid of the flow volume, the porosity of the workpiece may be determined. The measured porosity is a measured parameter which may be used for monitoring quality and for control of the production process. This porosity may be determined with the aid of the measured parameter of steam flow. The measurement of steam flow is, however, of basic interest, and may also be made during other process steps. The measurement of steam flow is effected preferably by determining a steam pressure and a steam temperature at the inlet valve of a steam chamber adjoining the mold cavity, and the steam flow, the steam temperature and a condensate amount at an outlet valve of another steam chamber adjacent to the mold cavity. The steam flow may be calculated from these measured parameters.

Several aspects of the present invention are explained above. These different aspects may be used separately or in any desired combination with one another.

Figure 2:
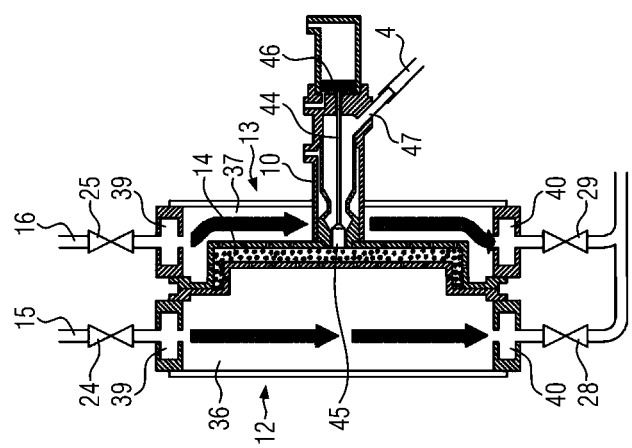
Figure 3:
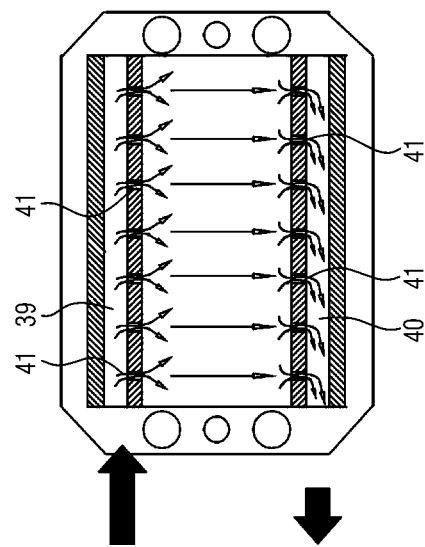

The invention is explained in detail and by way of example below with the aid of the drawings. The drawings show by way of example in:

FIG. 1 a schematic view of an apparatus for the production of a particle foam part FIG. 2 a mold in cross-section FIG. 3 a mold in a longitudinal section along line A-A of FIG. 2

Figure 6:
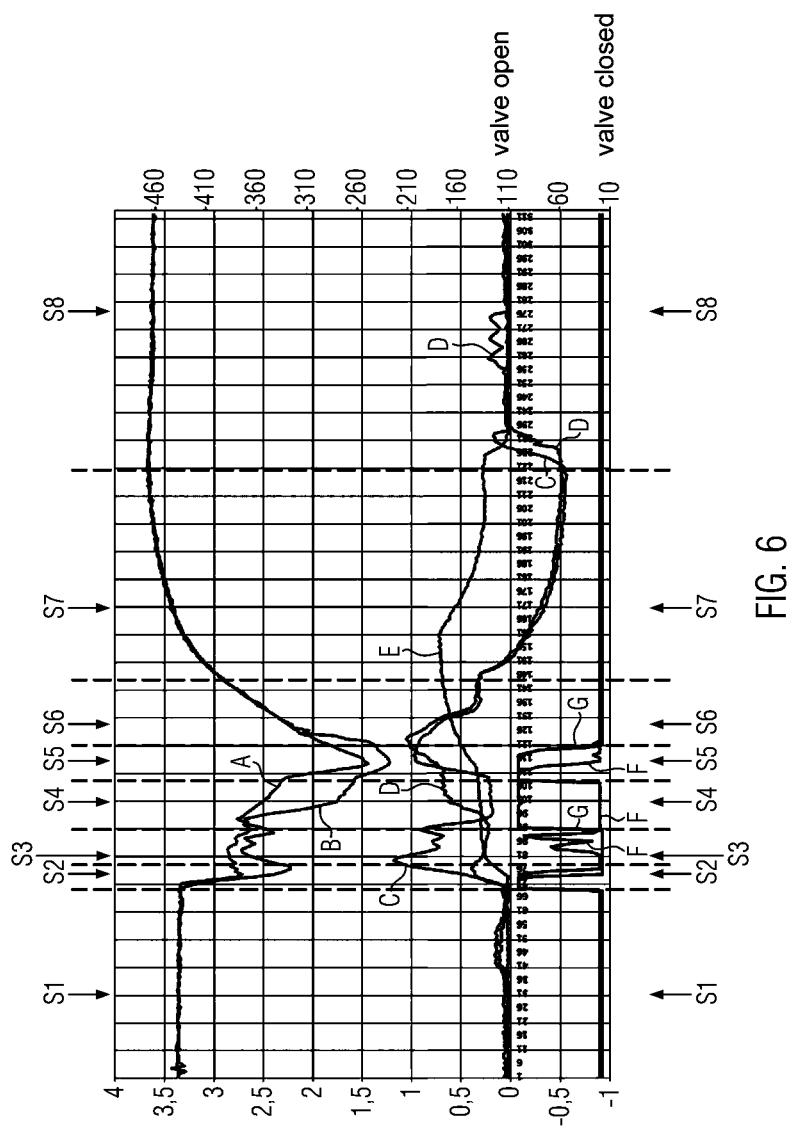
Figure 7:
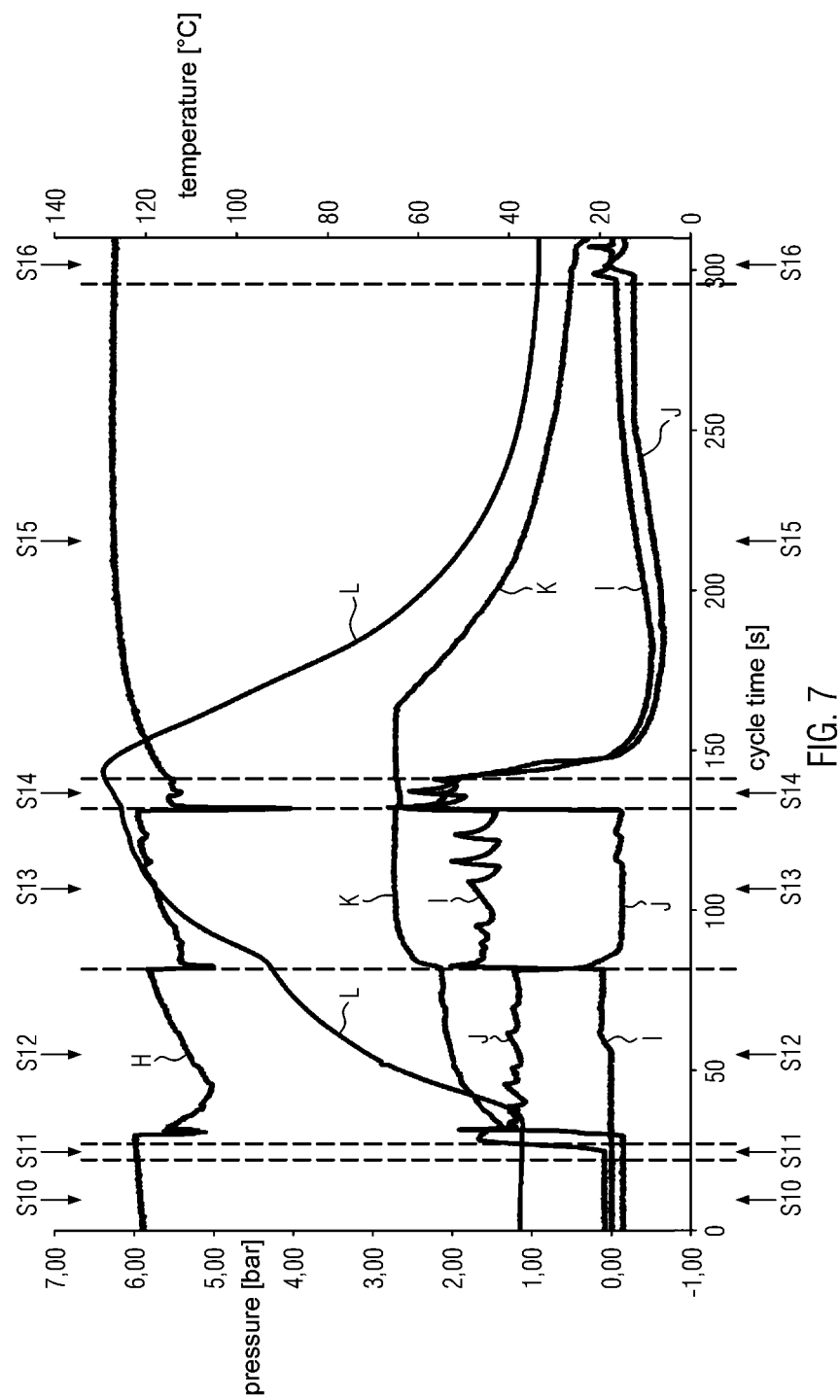
Figure 8:
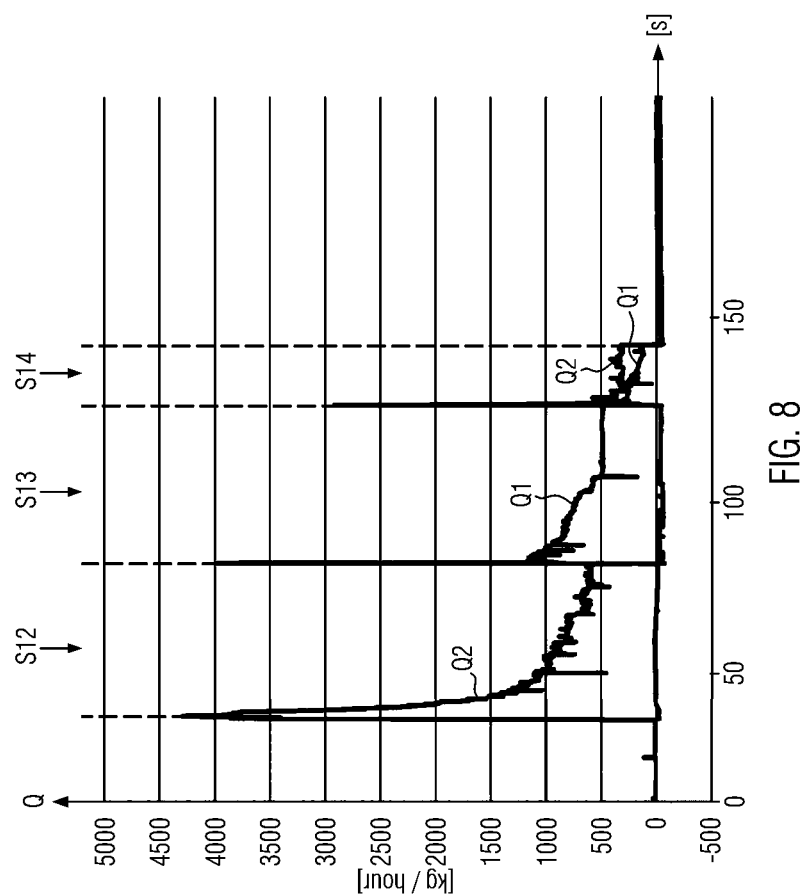
Figure 9:
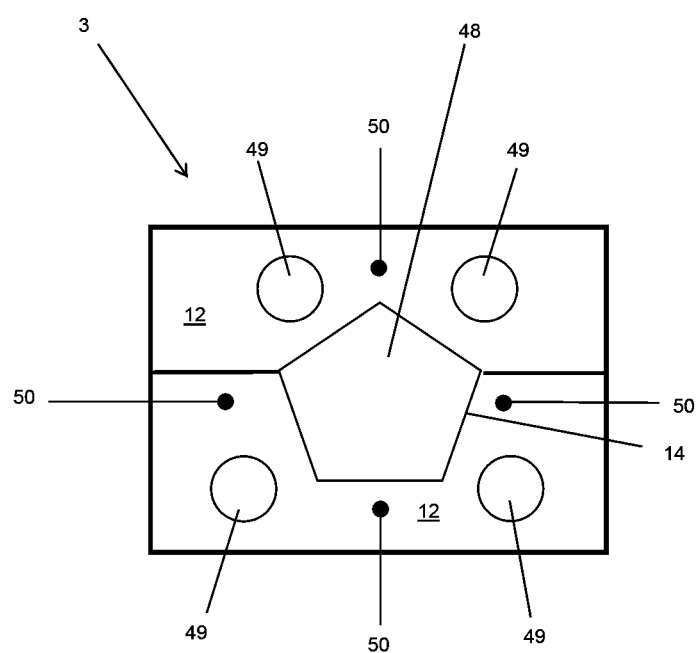

FIGS. 4a and 4b tables containing measured parameters which may be measured on the demolded particle foam part, wherein the measured parameter are assigned setting parameters which may be controlled by the respective measured parameters FIG. 5 a diagram showing three exponential falling curves FIG. 6 a diagram showing pressure curves and valve positions of a first embodiment for the production of a particle foam part from ePS FIG. 7 a diagram showing pressure curves of a second embodiment for the production of a particle foam part from ePU FIG. 8 a diagram showing the mass flow of the steam during cross steaming and autoclaving, and FIG. 9 schematic view of a mold in cross-section.

A first embodiment of an apparatus 1 according to the invention for the production of a particle foam part is shown in FIG. 1.

The apparatus 1 comprises a material container 2, a mold 3 and a pipe 4 leading from the material container 2 to the mold 3.

The material container 2 is used to hold loose foam particles. The material container 2 has a base 5, while in the base area it is connected via a compressed air line 6 to a compressed air source 7. The compressed air line 6 is connected to several nozzles (not shown) arranged in the base 5 so that several airflows (=fluidizing air) may be fed into the material container 2, which then swirl around and separate the foam particles held inside.

Formed in the area of the base 5 of the material container 2 is an opening to which the conveyor pipe 4 is connected. The opening may be closed by means of a slide 23.

Adjacent to the material container 2 in the conveyor pipe 4 is a blowing nozzle 8. The blowing nozzle 8 is connected by a further compressed air line 9 to the compressed air source 7. The compressed air fed to the blowing nozzle 8 is used as blowing air, since it enters the conveyor pipe 4 through the blowing nozzle 8 and flows towards the mold 3. This creates at the blowing nozzle 8, on the side facing the material container 2, a partial vacuum which sucks foam particles from out of the material container.

The conveyor pipe 4 leads to a filling injector 10 which is connected to the mold 3. The filling injector 10 is connected by a further compressed air line 11 to the compressed air source 7. The compressed air fed to the filling injector 10 is used on the one hand for filling the mold 3, in that the flow of foam particles is pressurized by the compressed air towards the mold 3. On the other hand the compressed air fed to the filling injector 10 may also be used for blowing foam particles back from the conveyor pipe 4 into the material container 2, when the filling process at the mold 3 is completed.

The mold 3 is formed of two mold halves 12, 13. Bounded between the two mold halves is at least one mold cavity 14, into which the filling injector 10 leads to introduce the foam particles. The volume of the mold cavity 14 may be reduced by moving together of the two mold halves 12, 13. With the mold halves 12, 13 moved apart, a gap is formed between the mold halves 12, 13, which is described as the crack gap. Such a mold 3 is therefore also described as a crack gap mold. The two mold halves 12, 13 have steam inlet valves 24, 25 and steam outlet valves 28, 29 which may be actuated by a control unit (not shown). The steam outlet valves 28, 29 make a communicating connection between the mold cavity 14 and the environment, so that gas from the mold cavity 14 may escape in a controlled manner.

The mold may also have several mold cavities which may be controlled as far as possible independently of one another in respect of filling, compaction and/or heating.

The two mold halves 12, 13 are connected via steam lines 15, 16 to a steam generator 17, in order to supply the mold cavity 14 with steam for welding the foam particles loaded therein. The steam inlet valves 24, 25 are located in the end sections of the steam lines 15, 16, adjacent to the mold halves 12, 13.

The steam generator 17 is connected by a steam line 18 to the material container 2, in order to supply the latter with steam. A further steam line 19 leads from the steam generator 17 to the blowing nozzle 8, so that steam may be fed to the flow of foam particles.

A steam line 20 connects the steam generator 17 to the filling injector 10, so that steam may be fed to the flow of foam particles passing through the filling injector 10.

A steam line 21 is provided which leads form the steam generator 17 to the conveyor pipe 4, while an injector nozzle (not shown) is provided at a suitable connection point 22 in the conveyor pipe 4, for introducing steam into the conveyor pipe 4.

Provided in the steam lines and compressed air lines are pneumatic or electrically controllable valves (not shown), so that the amounts of compressed air or steam supplied may be controlled exactly by a control unit (not shown).

The mold halves 12, 13 each have a mold cavity wall 33, 34. The outer surfaces of the mold cavity walls 33, 34 are so shaped that they match the negative contour of a particle foam part to be produced. The two mold cavity walls 33, 34 of the two mold halves 12, 13 may be moved together in such a way that they bound the mold cavity 14 which conforms to the shape of the particle foam part to be produced.

Formed in the mold cavity walls 33, 34 are a multiplicity of steam nozzles 35. The steam nozzles are through openings with a diameter which is sufficiently large to allow the passage of steam, but smaller than the foam particles to be welded.

Each of the mold halves 12, 13 has a steam chamber 36, 37, which is formed by the mold cavity walls 33, 34, further surrounding walls 38, a steam inflow passage 39 and a steam outflow passage 40.

The mold halves 12, 13 are roughly cuboid bodies, with the steam inflow passage 39 and the steam outflow passage 40 extending along opposite end faces. The steam inflow passage 39 is connected in each case to an inlet valve 24, 25 and the steam outflow passage 40 to a steam outlet valve 28, 29. The steam inflow passage 39 and the steam outflow passage 40 have several nozzles 41 distributed over their length, by which steam may be distributed to and removed from the respective steam chambers 36, 37.

Located in the steam lines 15, 16 are gas flow measuring devices 48, 49 for measuring the steam flow. Especially suitable gas flow measuring devices are those with measuring orifice plates (restriction plate flow-meters). The steam flow is measured as a mass flow Q in kg per hour (kg/hour). The mass flows measured in the steam lines 15, 16 are corrected with the aid of the temperature measured in the steam chambers 36, 37 and the pressure measured therein, so that the steam flow actually fed into the mold cavity 14 is determined.

Alternatively, the steam flow may be estimated indirectly from the steam pressures and the valve orifice position.

The filling injector 10 is mounted on one of the two mold halves 12, 13. The filling injector extends from the mold cavity surrounding wall 34 through the steam chamber 37 into the area outside the steam chamber 37. The filling injector 10 has a tubular housing 42, in which is arranged a nozzle tube 43 to form a valve nozzle. The nozzle tube 43 leads to an opening in the mold cavity surround 34. A quill 44 which may be arranged, able to slide longitudinally, in the nozzle tube 43, has a first closing pin 45 for closing the opening of the nozzle tube 43 located in the area of the mold cavity surround 34, and has a pneumatic piston 46 at the end remote from the mold cavity surround 34. The pneumatic piston 46 is located in a pneumatic cylinder and may be so actuated that the quill moves between a closed position in which the first closing pin 45 occupies the opening of the nozzle tube 43, and an open position in which the quill 44 is retracted a short distance into the nozzle tube 43, so that the nozzle tube 43 is open. The filling injector 10 has an opening 47 at which the conveyor pipe 4 opens out. In the open position of the quill there is therefore free passage from the conveyor pipe 4 through the nozzle tube 43 and through the mold cavity surround 34.

As already stated above, the two mold halves 12, 13, in the moved-together state, bound the mold cavity 14 (FIG. 2). Here, the mold cavity walls 33, 34 fit together so tightly in their peripheral area that no foam particles can escape the mold cavity 14. Moreover, in the peripheral zone, the mold cavity walls 33, 34 make a substantially gastight fit with one another, so that neither steam nor air can escape the peripheral zone of the mold cavity 14 in appreciable amounts.

The mold halves 12, 13 may be developed in such a way that at least one of the mold halves 12, 13 has in the peripheral section a sealing element (not shown), so that the two mold halves 12, 13 are already sealed against one another in the peripheral zone when they are arranged at a predetermined distance from one another. This distance is described as the crack gap. This sealing element is for example either a spring-biased, metal seal ring or a rubber lip. The sealing device is so designed that the two mold halves 12, 13 may be moved completely together until the mold cavity walls 33, 34 contact one another in the peripheral zone and there is a continuous seal in the opened state (=crack gap).

With such mold halves 12, 13 it is possible to set the crack gap and, in this arrangement, to fill the mold cavity with foam particles, followed by steaming, which takes place without appreciable amounts of steam escaping into the peripheral area.

A method for the production of particle foam parts using the apparatus described above will now be explained:

The method comprises the following basic steps:
filling of the mold cavity 14
rinsing of the steam chambers 36, 37 with steam
cross steaming, preferably with a first and a second cross steaming
autoclaving
secondary steaming (optional)
cooling
stabilization (optional)
demolding
cleaning of the mold (optional)
cleaning of the quill (optional).

To fill the mold cavity 14, air is blown into the area of the base 5 of the material container 2 via the compressed air line 6, in order to swirl around and separate the foam particles contained therein. At the same time, blowing air is fed to the blowing nozzle, so that foam particles are sucked out of the material container 2 into the conveyor pipe 4 and conveyed by the blowing air towards the mold 3. During filling, the outlet valves 28, 29 are opened, so that air can escape from the mold cavity 14. The mold cavity 14 itself is closed, while the mold halves 12, 13 may be moved completely together or spaced apart by a crack gap.

The slide 23 may be successively opened and closed. The opening and closing times lie typically in the range from 500 ms to 1 s. Through this cyclical opening and closing of the slide 23, the foam particles are fed intermittently from the material container 2 to the conveyor pipe 4. In this way it is possible to interrupt any bridging of foam particles in the material container 2, and the foam particles are separated. This is especially useful in the case of foam particles with an adhesive surface, such as e.g. eTPU foam particles.

Alternatively, intermittent suction may also be effected by an intermittent supply of blowing air from the compressed air line 9 to the blowing nozzle 8 located immediately adjacent to the material container 2.

Steam is fed via the steam line 18 from the steam generator 17 to the material container 2. The steam is dry saturated steam, which is fed to the material container 2 at the pressure (around 1 bar) existing in the material container. Preferably the steam in the material container 2 is sprayed into the material container 2 adjacent to the connection point of the conveyor pipe 4, so that the foam particles sucked into the conveyor pipe 4 are wetted by the steam. A further supply of steam to the flow of foam particles is effected at the blowing nozzle 8, at the connection point 22, and at the filling injector 10.

The temperature of the dry saturated steam is set by the boiling point curve of steam and so is preset by the existing pressure. At a pressure of around 1 bar in the conveyor pipe 4, the temperature of the saturated steam is approximately 100° C.

The amount of steam is set so that the foam particles are not activated at their surfaces and do not weld together in the conveyor pipe. For foam particles based on polyurethane, their welding temperature lies between around 80° C. and 130° C., depending on the material composition applicable in each case. The amount of steam should then be so measured that the foam particles do not reach a temperature of 90° C. or more along the conveyance path from the material container 2 to the mold 3. Preferably the steam is fed in at several points along the conveyance path. The conveyance of foam particles with addition of steam is described in detail in WO 2014/128214 A1, for which reason reference is made to this document.

Non-adhesive foam particles, such as e.g. foam particles of expanded polypropylene, expanded polyethylene or expanded polystyrol may even be conveyed reliably in the conveyor pipe without the addition of steam.

Several molds 3 may be provided simultaneously in one apparatus 1. If the back pressure in the filling injector 10 concerned is too high during filling, so that the airflow of the filling air flows, instead of into the mold, into the conveyor pipe 4 in the direction of the material container 2, then the filling flow stops automatically. This occurs when the mold cavity 14 of the relevant mold 3 is completely filled, and the first foam particles are located in the area of the orifice of the filling injector 10 facing the mold cavity 14.

The air flowing to the material container 2 conveys the foam particles back into the material container 2, which is also described as blowing back of the filling injector 10 into the conveyor pipe 4.

By means of a pressure sensor in the filling injector 10 and/or in the conveyor pipe 4, the increase in pressure of the conveying air generated by the filling of the mold cavity 14 with foam particles and the foam particles blocked back in the filling injector 10 may be detected. This detection may be made separately for each mold 3 or else jointly by means of a pressure sensor for all molds 3. This pressure sensor is located in a common section of the conveyor pipe 4 at a short distance from the molds 3 or filling injectors 10. After the complete filling of each of the molds 3 has been detected, the blowing back is carried out for a predetermined period of time, so that the conveyor pipe 4 is blown completely free of foam particles.

If the foam particles are conveyed with the addition of steam, then some of the steam condenses in the conveyor pipe 4. On blowing back, the condensed water is conveyed into the material container 2 where it wets the foam particles held therein. This improves flow properties in subsequent filling processes.

As soon as it is determined that the mold cavities 14 are filled with foam particles, the filling injectors 10 are closed, by traversing the quills 44 with their closing pins 45 into the orifice of the nozzle tube 43. If the complete filling of the individual molds is detected independently of one another, then the relevant filling injectors 10 are closed when the respective mold cavity 14 has been filled. If the detection of mold filling is determined jointly, then the filling injectors 10 are closed only when the mold cavities 14 of all molds are filled. For blowing back foam particles, the air pressure supplied at the filling injectors 10 is increased to the maximum possible pressure. Fluidizing air is also preferably used here.

Once the foam particles have been conveyed from the conveyor pipe 4 back into the material container 2, the material container 2 may be refilled and put back under pressure.

By means of the detection, explained above, of the air pressure in the conveyor pipe 4 or the pressure of the filling air supplied to the injector 10, the complete filling of each mold cavity may be detected and the filling of the mold cavity ended. Through the detection of the filling state, on the one hand incorrect filling is avoided, while on the other hand cycle time is reduced as compared with conventional methods in which a predetermined time is set for filling. This duration was formerly determined empirically. In particular the detection of the filling state of the individual mold cavities with the aid of the filling pressure or the air pressure in the already branched conveyor pipe 4 permits individual monitoring of the filling state of the individual mold cavities. This is especially useful when mold cavities with different volumes are used, taking correspondingly different lengths of time to fill. If the complete filling of a mold cavity is recognized, so that preferably firstly the supply of filling air at the relevant injector 10 is stopped or only when all mold cavities are closed is filling air once more supplied to the injector 10 for blowing back the foam particles still in the conveyor pipe. This avoids blowing back from branches of the conveyor pipe 4 leading to already filled mold cavities, while at the same time other mold cavities are still to be filled. Such individual monitoring of the filling state of individual mold cavities permits the use of mold cavities with highly differing volumes.

Since the whole system is subject to pressure fluctuations, it is expedient to smooth out the measured values. For this purpose the measured values of the individual sensors may be digitized and smoothed e.g. by means of an integral step.

The quantity of foam particles fed to the respective mold cavities depends above all on the set pressures. Here a distinction is made between material container pressure, fluidizing air pressure, conveyor pipe pressure and filling pressure. The material container pressure is the pressure in the material container 2. Here, the pressure prevailing at the start of the filling process in the material container 2 may be recorded as the material container pressure.

The fluidizing air pressure is that pressure under which fluidizing air is fed into an inlet area of one or more openings of the material container 2, in order to prevent bridging.

The conveyor pipe pressure is the pressure within the conveyor pipe in the area between the material container 2 and the filling injector 10. Since the conveyor pipe may be fed with compressed air (blowing nozzle 8) and steam (connection point 22) at several points along the pipe 4, and also steam may condense in the pipe 4, varying conveyor pipe pressures may exist along the conveyor pipe. The conveyor pipe pressures may also differ due to the geometry of the conveyor pipe 4 and the drops in pressure which this causes. It may therefore be expedient to allow for several "conveyor pipe pressures".

The filling air pressure is the pressure of the filling air fed to the respective injector 10. This filling air pressure is measured by a pressure sensor in the injector 10.

There may also be a counter-pressure due to the steam outlet valves 28, 29 of the steam chambers being only partly open, so that a back pressure forms in the respective steam chambers 36, 37 and acts via the steam nozzles 35 on the mold cavity 14. The counter-pressure is measured by a sensor in each steam chamber 36, 37. The steam outlet valves 28, 29 are controlled by a control device in such a way that they generate a predetermined counter-pressure in the steam chambers 36, 37. Through the provision of a counter-pressure, the pressure in the conveyor pipe 4 and in the mold cavity 14 is kept high, which keeps the foam particles at a low volume. By this means it is possible for more foam particles to be fed into a mold cavity 14 than is possible with application of a counter-pressure. After withdrawal of the counter-pressure, the foam particles expand in the mold cavity 14. A further parameter for setting the filling quantity is the crack gap, i.e. the gap by which the two mold halves 12, 13 are spaced apart from one another during filling. The use of a crack gap during filling increases especially the density in the thin sectors of the particle foam part to be produced.

Preferably the weight of the individual particle foam part to be produced is measured and the filling quantity adjusted automatically with the aid of the measured weight. Adjustment of the filling quantity may be effected by adjustment of the crack gap.

The surface of the produced particle foam parts may also be recorded by a camera, by means of which imperfections on the surface may be detected. These imperfections are due to uneven filling of the mold cavity.

The filling quantity may be increased by raising the material container pressure. If a counter-pressure is used, the filling quantity may also be increased by raising the counter-pressure. The filling quantity may also be increased by widening the crack gap, if a crack gap is used, Increasing the filling air pressure may increase the filling quantity slightly, but here the effect is significantly less than that obtained by raising the material container pressure or the counter-pressure. Depending on the measured weight of the particle foam parts, it is therefore possible to change one or more of these parameters accordingly.

The evenness of filling of the mold cavity 14 depends especially on the filling air pressure. Depending on the design of the mold cavity 14, a low filling air pressure or a high filling air pressure may be expedient. With a low filling air pressure the flow rate of the incoming foam particles is less than with a high filling air pressure. The evenness of filling is also influenced by the conveyor pipe pressure or pressures, the fluidizing air pressure and the material container pressure. If the foam particles are fed under added steam, then the pressure under which the steam is fed to the conveyor pipe also influences the evenness of filling of the mold cavity 14.

Between filling quantity and the parameters material container pressure, counter-pressure and crack gap there are proportional relationships which may be regulated by conventional controllers (P controller, PI controller, PID controller). In taking into account the surface texture of the particle foam parts detected by the camera, the relationships are much more complex, since the geometry of the mold cavity also has an influence here. For this purpose a neural network may be used as controller, having as its input parameters at least one of the measured pressures, preferably several of these pressures and in particular all the measured pressures, the image recorded by the camera or parameters derived from the image and/or the shape of the mold cavity 14 or certain characteristics of the mold cavity.

The parameters derived from the image may be e.g. the number of dark spots (imperfections), wherein the spots should have in particular a minimum size, the size of the dark areas, or other variables describing the regularity of the surface texture.

The characteristics of the mold cavity may be the evenness of the flow path from the filling injector to the points in the mold cavity remote from the filling injector. These are for example statistical variables, such as the standard deviation of the flow cross-section from the filling injector 10 to each remote point of the mold cavity. This may also be the maximum and the minimum cross-section of the mold cavity, through which the foam particles flow. Other characteristics are the distance between narrow points and the filling injector in the flow path in the mold cavity. The automatic control of the pressures and/or the crack gap relative to the evenness of filling of the mold cavity is a multi-dimensional problem. Here it is expedient to use a self-learning facility, such as e.g. a neural network, which learns during a learning phase. At the input side of the neural network, one or more of the following parameters are applied: material container pressure, fluidizing air pressure, conveyor pipe pressure(s), filling air pressure(s), crack gap, imaging of the surface of a produced particle foam part or variables derived from such imaging, characteristic variables of the mold cavity.

During a learning phase of the neural network, the particle foam parts produced with different parameters are rated manually in respect of their quality, and this rating is fed into the neural network. The rating is made preferably in several quality steps, including at least two quality steps, namely rejects and correct particle foam parts, but may also include several quality steps.

A control device which has been taught in this way can then automatically set the parameters for obtaining even filling of the mold cavity. With a self-learning control of this kind it is also possible to set the filling quantity at the same time as the evenness of filling. For this purpose, the weight of the molded part is applied as input value for the neural network, with the target weight being input during the learning phase.

After filling of the mold cavity, the steam chambers 36, 37 are rinsed with steam. During rinsing of the steam chambers 36, 37, the air they contain is displaced by steam. Both steam inlet valves 24, 25 and steam outlet valves 28, 29 of the two steam chambers 36, 37 are opened. The steam flows evenly through the steam chambers 36, 37.

With different chamber volumes, different pressures may be expedient in order to obtain even steam throughflow and mold heating.

During rinsing of the steam chambers, the following setting parameters apply:

Duration of rinsing, pressure of the steam at the steam inlet valve 24, 25, temperature of the steam at the steam inlet valve 24, 25.

The following measured parameters apply:
Pressure of the steam at the steam outlet valve 28, 29, temperature of the steam at the steam outlet valve 28, 29, temperature of the condensate at the steam outlet valves 28, 29.

The rinsing may be carried out for a predetermined period of time. Preferably the steam chambers are rinsed until the temperature of the steam at the outlet valve has reached a predetermined value. Rinsing in the two steam chambers 36, 37 is preferably controlled independently. This applies especially when the steam chambers 36, 37 are of different volume.

If the air has been completely expelled from the steam chambers 36, 37 and the mold halves 12, 13 are adequately preheated, then cross steaming is carried out. During cross steaming, the steam inlet valve 24, 25 of one of the two steam chambers 36, 37 is opened and the other steam inflow passage 39, 40 is closed and the steam outlet valve 28, 29 of the steam chambers 36, 37, the steam inflow passage 39, 40 of which is open, is closed and the other steam outlet valves 28, 29 is opened. By this means, steam flows from one of the steam chambers 36, 37 through the steam nozzles 35 into the mold cavity 14 and from the mold cavity 14 through the nozzles 41 into the other steam chamber 36, 37. If a first and second cross steaming are carried out, then the steam in the first cross steaming is guided through the mold cavity 14 in a certain direction from one of the two steam chambers to the other steam chamber, and during the second cross steaming in the opposite direction.

For control and regulation of the cross steaming there are provided a temperature sensor on the mold 3 and in particular in each case one temperature sensor on one of the mold halves 12, 13, a pressure sensor in each case on the steam inlet valves 24, 25 and the steam outlet valves 28, 29, a pressure sensor in the mold cavity 14 to measure a foam pressure and a sensor to detect the open position of the steam inlet valves 24, 25 and the steam outlet valves 28, 29. Instead of the sensor for measuring the valve position, it is also possible to use a suitable default value to set the valve concerned. The foam pressure is the pressure in the mold cavity 14. The foam pressure is in many operating states exerted almost exclusively by the expanded foam particles and in other operating states by the steam contained therein or by both.

Cross steaming may be controlled or regulated by means of the setting parameters mold temperature, steam pressure at the steam inlet valve or steam outlet valve, steam flow and counter-pressure (optional). Here it applies basically that temperature may be controlled by steam pressure. When using counter-pressure, pressure is increased in the mold cavity as a whole so that the foam particles are compressed. This leads to an enlargement of the spandrels and an increase in steam flow.

In the conventional apparatus, cross steaming is controlled by pressure. It may also be controlled by back pressure, wherein the steam outlet valve at which the steam exits is regulated to a certain pressure. In the conventional apparatus, cross steaming is carried out for a predetermined time, with the cross steaming time running either from the start of opening of the valves or process-based up to the reaching of a certain foam pressure in the mold cavity 14. Too high a foam pressure in the mold means that the particle foam part collapses on cooling or burns on the surface. Collapsing means that the particle foam part is too small. Too low a foam pressure may be due on the one hand to the mold not being adequately filled with foam particles, or on the other hand to the steaming time being too short, so that the individual foam particles are not correctly welded to one another and do not expand sufficiently. The reason for foam pressure being too low may be established by measuring the weight of the particle foam part and by measuring the strength of the particle foam part.

According to an aspect of the present invention, the foam target pressure is adjusted automatically by measuring the size and/or the weight and/or the strength of the particle foam part. In combination or as an alternative to measuring the size, an image of the surface of the particle foam part taken by camera may be analyzed in detail, to see whether the particle foam part is burnt and has corresponding dark spots. On the basis of these measurements, the foam target pressure is set so that the particle foam part has the correct size and quality.

The duration of cross steaming may be determined by measuring a steam flow resistance of the material in the mold cavity 14. On reaching a certain steam flow resistance, a switch is made from the first to the second cross steaming, and on reaching a further steam flow resistance the second cross steaming is terminated. The steam flow resistance is determined from the steam flow, which is the measured amount of steam per unit of time. Measurement of the amount of steam is relatively approximate, since a portion of the steam condenses, which alters the measured result. Compensation may be made for this factor by measuring the amount of condensate issuing from the steam outlet valve 28, 29. In addition, the steam flow resistance is influenced considerably by the nozzles 41 in the mold cavity walls 33, 34, for which reason the portion of steam flow resistance caused by the particle foam part can be detected only with a relatively high lack of clarity. For process control, however, no absolute steam flow resistance values are needed. It is sufficient to have relative values which indicate the change in steam flow resistance during the process.

Alternatively, according to an aspect of the present invention, the steam flow resistance may be determined several times, with at least three measurements of steam flow resistance being made. Preferably more than three measurements of steam flow resistance are undertaken. With the aid of the measured steam flow resistance values and the respective points in time at which the steam flow resistance values we measured, the exponential change in steam flow resistance is determined. From this exponential patter, the time constant T may be derived. Consequently, cross steaming may be terminated after the expiry of a period of time corresponding to three times the time constant T. This means that over 95% of the target steam flow resistance of the cross steaming has been reached, without the need to preset an explicit target steam flow resistance.

According to a further alternative, the foam pressure may be sampled several times, with at least three measurements of foam pressure being made. Preferably more than three measurements of foam pressure are made. With the aid of the measured foam pressure values and the respective points in time at which the foam pressure values were measured, the exponential change in foam pressure is determined. From this exponential course, the time constant T may be derived. In the present embodiment, cross steaming is ended after the expiry of a period of time corresponding to three times the time constant T. This means that over 95% of the target foam pressure of cross steaming has been reached, without the need to preset an explicit target foam pressure.

Cross steaming is followed by autoclaving. For this, both steam outlet valves 28, 29 are closed. Both steam inlet valves 24, 25 are opened in a controlled manner, so that a predetermined pressure ensues in the steam chambers 36, 37. The pressures of the two steam chambers 36, 37 may also be set at different values. This has an influence on welding, the surface and the reference behavior of the particle foam parts.

During autoclaving, the foam pressure in the mold cavity 14 is measured by means of a pressure sensor, and the mold temperature by means of a temperature sensor.

Autoclaving should result in the almost complete welding of the particle foam part. Here the rise in foam pressure falls exponentially, i.e. to begin with the foam pressure rises sharply and then, at a lower rate, approaches a target foam pressure. The changes in foam pressure are thus subject to an exponential course.

According to an aspect of the present invention, the foam pressure may be sampled several times, with at least three measurements of foam pressure being made. Preferably more than three measurements of foam pressure are made. With the aid of the measured foam pressure values and the respective points in time at which the foam pressure values were measured, the exponential change in foam pressure is determined. From this exponential course, the time constant T may be derived. In the present embodiment, autoclaving is ended after the expiry of a period of time corresponding to three times the time constant T. This means that over 95% of the target foam pressure of autoclaving has been reached, without the need to preset an explicit target foam pressure.

FIG. 5 shows three exponentially falling curves I, II and III. Curve I has a time constant T of 1 s, curve II a time constant of 2 s and curve III a time constant of 3 s. The time in seconds is plotted on the abscissa, while the ordinate shows any desired measured variable. All three curves start at time point 0 with value 1. After 3T the value is in each case 0.05%, i.e. it is reduced by 95% or is only 5% from the final state, which in this case is 0.

The duration of autoclaving may also lie within a time range of 2 to 4 times the time constant T, in particular 2.5 to 3.5 times the time constant T.

With this method, a particular process step may be conducted for an optimal duration, wherein a specific target value or final state of a variable characteristic for the process step is almost reached, without the need to preset the target value explicitly. The method may therefore be adapted easily to different factors (different materials, different pressure and temperature settings). In addition, the process step is executed for only so long as is necessary, making the method very efficient to implement. In the present embodiment, foam pressure is the characteristic variable. This method, in which the time period within which a step or a sub-step of a particular process is to be carried out corresponds to a predetermined multiple of T, may also be applied to other steps or sub-steps which have a characteristic variable with an exponential course, wherein the characteristic compressed variable approaches a target value.

Autoclaving may be followed by secondary steaming. For secondary steaming, all steam inlet and steam outlet valves 24, 25, 28 and 29 are closed. Secondary steaming serves for homogenization of the welding and of the temperatures and pressures in the foam. It is carried out especially for larger particle foam parts. For small particle foam parts, e.g. shoe soles, it is generally not necessary. For larger particle foam parts such as e.g. insulation panels, however, secondary steaming is very useful.

Secondary steaming is terminated when the foam pressure has fallen to a specific target value. Since here too, foam pressure once again follows an exponential patter, the duration of secondary steaming may be set using the method described for autoclaving. It is also possible to determine the dissipation of foam pressure over time and, once the change in foam pressure has fallen below a prescribed value, to bring secondary steaming to an end.

After autodaving or secondary steaming, the particle foam part is cooled in the mold 3. For this, the mold 3 is closed. The mold 3 is closed for this purpose. The steam outlet valves 28, 29 are opened, to reduce the still existing overpressure. After the pressure in the steam chambers 36, 37 has reduced somewhat, cooling water is sprayed into the steam chambers 36, 37 through suitable nozzles (not shown). The cooling water nozzles atomize the water, and are so arranged that the atomized water reaches and cools the mold cavity walls 33, 34. The cooling produces a pressure drop and a partial vacuum in the steam chambers. This partial vacuum leads to condensation of the cooling water on the surface of the mold cavity walls 33, 34, even at temperatures of below 100° C., thus ensuring rapid cooling. During cooling, the condensate which has collected during autodaving and secondary steaming, and the subsequently sprayed-in cooling water, flow out of the steam outlet valves 28, 29.

Optionally it is possible, with a partial vacuum (e.g. −0.5 bar) or vacuum, to evaporate the condensate and cooling water in the steam chambers and to remove it from the mold.

On cooling, the foam pressure reduces with an exponential course to a foam pressure target value. Cooling is terminated when the foam pressure has fallen to a specific target value. Since here too the foam pressure once again follows an exponential course, the duration of cooling may be set by the method described for autoclaving. It is also possible to determine the dissipation of foam pressure over time and, once the change in foam pressure has fallen below a prescribed value, to bring cooling to an end.

Cooling may also be terminated when the foam pressure has fallen below a predetermined threshold and is roughly constant, or the second dissipation of the foam pressure has overshot a zero point and the first dissipation lies below a threshold.

Cooling is followed by stabilization. In the simplest embodiment, stabilization is merely waiting, so that the heat contained in the particle foam part may transfer to the already cooled mold cavity walls 33, 34. The particle foam part is a good thermal insulator, so that this may take some time. The walls of the foam particles contained in the particle foam part and the hot gas contained within the particles should be cooled down sufficiently that, on subsequent demolding, the internal pressure of the particles is so low that the particle walls are no longer subject to plastic deformation. Preferably, during stabilization, a partial vacuum or vacuum is applied to the steam chambers 36, 37, in order to evaporate moisture in the steam chambers and/or the particle foam part, and by this means to withdraw heat.

The duration of stabilization may be controlled with the aid of the temperature of the two mold halves 12, 13 and the foam pressure. The foam pressure once again follows an exponential course, with which the method of determining the duration of the stabilization step may be used.

If the particle foam part has been adequately stabilized, then it may be demolded. For this purpose the two mold halves 12, 13 are moved apart while, with the aid of holding mechanisms and/or compressed air and/or vacuum, the particle foam part is held in a specific one of the two mold halves 12, 13.

The particle foam part produced may, after opening of the mold halves 12, 13, be ejected by compressed air and/or a plunger. As plunger, generally an ejector and/or filling injector with ejector function is used.

Ejection may be monitored by camera to ensure the the mold is free for the production of another particle foam part.

The mold halves 12, 13 may be cleaned by passing compressed air through them.

The quill may be cleaned by blowing filling air through the opened filling injector.

The steps described above, from filling to demolding, are repeated on a cyclic basis, with a particle foam part being produced in each mold in each cycle.

The method explained above may also be modified to the effect that the mold 3 or the mold halves 12, 13 may be preheated by a suitable heating device before and/or after filling. The heating device is preferably integrated in the mold 3 and in particular in the mold cavity walls 33, 34. The heating device is typically an electrical heating device with heated filaments.

The cyclical preheating of the mold prevents the supplied steam from not only heating up the mold and by this means losing energy, but also the heat of the steam being almost completely incorporated in the foam particles. With a cold mold, the mold takes up the heat of the steam, meaning that the foam particles certainly react, and the spandrels close. However, this does not always result in proper welding. This applies especially to the core of the particle foam part. If the particle foam part welds first in the edge area, then a further supply of steam to the core of the particle foam part is impeded or restricted. Preheating of the mold halves 12, 13 reduces the risk that the heat of the steam is not correctly incorporated into the foam particles. In particular after filling or during rinsing of the chambers, preheating takes place, since the temperature of the mold at the start of steaming (first cross steaming) has a considerable influence on the heat transfer. During filling, a large quantity of compressed air is blown into and through the mold 3. Depending on compressed air temperature, filling pressure setting and filling times which, e.g. owing to process-dependent filling detection, may vary from cycle to cycle, differing mold temperatures may occur after filling. This may be balanced out by preheating. Due to preheating with a heating device, rinsing of the chambers serves only to force the air out of the steam chambers. It is not necessary to set the mold temperature by rinsing the chambers. Consequently, chamber rinsing time may be reduced and the throughput achievable with the apparatus may be increased.

The apparatus may have a measuring station for measuring the produced particle foam parts. The measuring station has one or more measuring devices which are linked to a control unit. The control unit is connected to the apparatus for the production of particle foam parts shown in FIG. 1, in order to set one or more setting parameters (machine parameters).

The control unit may have one or more control devices which may set a wide variety of control variables. One or even several control devices or control circuits may be interlinked, so that several control variables (actual values) influence a control value. the measuring station has one or more of the following measuring devices:

weighing scales
camera
laser scanner
flow resistance measuring device
strength measuring device.

With the measuring devices, each particle foam part produced may be analyzed. It may however also be sensible to measure samples, in particular, if the measured value is destructive and the relevant particle foam part is destroyed.

The weight of the particle foam part is measured on the weighing scales.

The camera is used to measure the contour or shape and/or the dimensions of the particle foam part. The surface color of the particle foam part may also be determined by the camera. In addition, the camera may be used to obtain certain information on surface structure. The laser scanner is used to record the surface structure, and is able to capture very precisely the contour of the surface of the particle foam part. The laser scanner is preferably a 3D laser scanner, so that the spatial structure of the surface of the particle foam part may be detected.

The flow resistance measuring device is used to measure the flow resistance of a fluid, in particular a gas, such as e.g. air, which is fed through the particle foam part. The flow resistance measuring device has a tube which is placed on top of the particle foam part. For this purpose the particle foam part lies on a wide-mesh rack so that, on the side opposite the tube, no significant air resistance is created by the rack. The rack is connected to a compressed air source and has a flow sensor for measuring the air throughput. By this means the flow resistance of the particle foam part in the area in which the tube contacts the particle foam part may be measured.

The strength measuring device may be designed to measure flexibility by means of a bending test, hardness by means of a hardness test, tear strength by means of a breaking test in which that force is determined which is necessary to tear the particle foam part into two parts. There may also be a torsional strength measuring device for measuring the torque required to obtain a certain torsional rotation. A non-destructive test to measure the strength of the demolded particle foam part may also be conducted on samples.

The tables in FIGS. 4a and 4b show the measured parameters which may be detected with suitable measuring devices and the setting parameters on which the respective measured parameters have influence. Shown for each of the measured parameters is the type of measured parameter (e.g. weight) and the deviation of the measured parameter (e.g. weight of the particle foam part too high), together with the corresponding settings of the setting parameters. If, for a certain deviation, several setting parameters are given, then they may be applied separately or in combination. Only in the case of the measured parameter "surface structure with internal welding" in combination with the deviation "molten surface with poor internal welding" is both a setting parameter left of "+" and a setting parameter right of "+" to be applied. The surface structure is scanned for example by a laser scanner, a stereo camera or a 3D time-of-flight camera. Internal welding may be evaluated for example with the aid of porosity which, as explained above, may be measured in the mold or also on the demolded particle foam part. Internal welding may also be evaluated with the aid of the strength of the particle foam part alone or in combination with porosity.

If the measured parameter measured on the demolded particle foam part (PST) is a measured parameter describing the surface, in particular a measured parameter by which imperfections in the particle foam part may be detected, then one or more of the setting parameters, filling pressure on filling, drainage time after autoclaving or stabilization for drainage of the mold, the amount of water or steam supplied and/or the cooling time, may be adjusted automatically.

A very informative measured parameter of the demolded particle foam part (PST) is its weight. Depending on weight, in particular the crack gap on filling of the mold with foam particles to produce a further particle foam part is set on the basis of the measured weight. If the measured weight is greater than a target weight, then the crack gap is correspondingly reduced, and if the measured weight is lower than the target weight, then the crack gap is correspondingly enlarged. The quantity of foam particles fed to the mold may be adjusted though the setting of the crack gap. In addition, depending on weight, the further setting parameters material container pressure, filling air pressure and/or filling time may be varied depending on the measured weight.

The setting of these parameters depending on weight is of particular benefit in the use of polyurethane-based foam particles, since here a small deviation from a target amount of foam particles may lead to considerable variations in quality.

Preferably, with these measured parameters detected on the demolded particle foam part, the duration of individual specific steps or sub-step of the production process and/or a predetermined pressure and/or a prescribed temperature are adjusted automatically.

Another measured parameter which may be detected on the particle foam part (PST) is a geometrical shape (contour). Understood as such a geometrical shape is in particular the course of a specific surface or edge. The surface has a certain target course, which may be concave, flat or convex, or designed with suitable differing sections. If the measured geometrical shape is more convex than a target shape, then the individual foam particles have been expanded too strongly. Expansion of the foam particles may be influenced by the duration of stabilization, autoclaving and/or cooling. If excessive expansion is detected by the measured geometrical shape, then stabilization or autoclaving should be cut back or cooling extended.

Preferably used as control variables are not only the measured parameters detectable by the measuring station but also the parameters detectable in the apparatus 1 as input variables or control variables for the control device.

The control device is preferably a self-learning system, in particular a neural network, by which a multiplicity of different input parameters may be recorded and a multiplicity of setting parameters may be formed. The measured parameter are the input parameters of the neural network and the setting parameters are the output parameters. In the learning phase of the neural network, the quality of the particle foam part produced is determined and input manually. After the learning phase, the apparatus automatically produces particle foam parts with the quality memorized during the learning phase, while the control device compensates automatically for variations in the material properties of the foam particles, the media supplied and on account of the use of different molds.

EXAMPLE 1

An embodiment of the production of a particle foam part made of polystyrol foam particles will be explained in detail below. FIG. 6 shows the relevant pressure curves and the valve positions of the steam outlet valves. In this case the apparatus shown in FIG. 2 is used.

The following curves are plotted in the diagram:
A: pressure in the steam line 15 which leads to the first steam chambers 36
B: pressure in the steam line 16 which leads to the second steam chamber 37
C: pressure in the first steam chamber 36
D: pressure in the second steam chamber 37
E: pressure in the mold cavity 14 (foam)
F: valve position of the steam inlet valve 24 of the first steam chamber 36
G: valve position of the steam inlet valve 25 of the second steam chamber 37.

Filling of the Mold (S1)

During filling of the mold (with no crack gap), there is no overpressure in the steam chambers 36, 37. Minimal overpressure (pressures C, D) is measured for a short time only due to the forcing of air out of the mold cavity 14 into the steam chambers 36, 37. Since the inlet valves 24, 25 and the steam outlet valves 28, 29 are closed, the pressures in the steam lines 15, 16 and in the outlet line are constant.

Rinsing (S2)

During rinsing, the pressures C, D in the first and second steam chambers 36, 37 rise, and the pressures A, B in the steam lines 15, 16 correspondingly fall. The steam inlet valves 24, 25 (curves F, G) are open.

Cross Steaming (S3)

For the first cross steaming (cross steaming 1), the steam inlet valve 25 (curve G) and the steam outlet valve 28 are closed. Here, steam is fed by the steam line 15 through the steam inlet valve 24 (curve F) into the first steam chamber 36, from which the steam flows through the mold cavity 14 into the second steam chamber 37. From rinsing (S2), the pressure in the first steam chamber 36 is still so high that the steam inlet valve 24 can, to begin with, still remain closed, and only opened gradually during the first cross steaming. The open position of the steam inlet valves 24, 25 is controlled on the basis of the pressure prevailing in the respective steam chamber 36, 37. From the second steam chamber 37, the steam exits at the steam outlet valve 29. Since, due to the foam particles in the mold cavity 14, the steam flow in the mold cavity 14 encounters resistance, the steam pressure C in the first steam chamber 36 continues to rise.

Since the foam particles expand during cross steaming, foam pressure rises in the mold cavity 14.

Cross Steaming 2 (S4)

In the second cross steaming, the inlet valve 24 (curve F) and the outlet valve 29 are closed, and the inlet valve 25 (curve G) and the outlet valve 28 are open, so that steam is fed by the second steam line 16 into the second steam chamber 37. The steam flows from the second steam chamber through the mold cavity 14 into the first steam chamber 36 and from there through the outlet valve 28. Since the foam particles in the mold cavity 14 again represent a flow resistance, the steam pressure in the second steam chamber 37 rises and the steam pressure C in the first steam chamber 36 falls.

The foam pressure E increases only slightly. Foam pressure E is measured in the mold cavity 14 on the side facing the first steam chamber 36. If one were to measure foam pressure on the other side of the mold cavity 14, then here it would rise correspondingly, since on the one hand the steam backs up at the foam particles, leading to a pressure rise, and on the other hand the foam particles on the side facing the second steam chamber are strongly heated, causing them to expand and thus increase pressure.

Foam pressure E and the pressure in the first pressure camber C are identical and rise synchronously. Measurement shows a slight mismatch due to measuring tolerance.

Autoclaving (S5)

For autoclaving, both steam outlet valves 28, 29 are closed. The two inlet valves 24, 25 (curves F, G) are open. This raises the pressure in the steam chambers 36, 37, which is set at roughly the same value (curves C, D). The foam pressure E rises further owing to the expansion of the foam particles. In the present embodiment, the first steam inlet valve 24 (curve F) is closed earlier than the second steam inlet valve 25 (curve G) during autoclaving. The reason for this is possibly unsymmetrical sealing of the mold 3.

Cooling (S6)

In cooling, the steam outlet valves 28, 29 are opened in order to lower the existing overpressure. After the pressure in the steam chambers 36, 37 has somewhat reduced, cooling water is sprayed in. The pressures C, D in the first and second steam chambers 36, 37 therefore drop a little. The foam pressure E continues to rise, since the foam particles expand due to the heat still present in the mold cavity 14.

Stabilization (S7)

For stabilization, a partial vacuum is applied. By this means, moisture and heat are withdrawn from the steam chambers and from the particle foam part. This reduces the pressures C, D in the first and second steam chambers to a value of −0.5 bar, with 0 corresponding to atmospheric pressure. The foam pressure in the mold cavity also falls accordingly, with the pressure decrease being delayed. The foam particles are, to begin with, still hot and expand somewhat. The foam pressure E in the mold cavity 14 reduces exponentially on account of the cooling. Stabilization is ended after the expiry of around two to four times the time constant T of the exponential pressure decrease of the foam pressure E.

Demolding (S8)

For demolding, the mold and therefore the mold cavity 14 are opened. Atmospheric pressure ensues in both the steam chambers 36, 37 and in the mold cavity.

EXAMPLE 2

A second embodiment of the production of a particle foam part made of foam particles of polyurethane (eTPU) will be explained in detail below. FIG. 7 shows the relevant pressure curves of a production cycle. In this case the apparatus shown in FIG. 2 is used.

The following curves are plotted in the diagram:

H: pressure in the steam line 15 which leads to the first steam chamber 36
I: pressure in the first steam chamber 36
J: pressure in the second steam chamber 37
K: pressure in the mold cavity 14 (foam pressure)
L: temperature in the mold cavity 14

Filling of the Mold Cavity (S10)

In filling of the mold cavity (with crack gap), there is no overpressure (curves I, J) in the steam chambers 36, 37.

Closing of the Crack Gap (S11)

On closing of the crack gap, the foam pressure (curve K) rises, since the foam particles are compressed in the mold cavity 14.

Cross Steaming (S12)

In the first cross steaming, the steam inlet valve 24 and the steam outlet valve 29 are closed and the inlet valve 25 and the outlet valve 28 are opened, so that steam is fed by the second steam line 16 into the second steam chamber 37. The steam flows from the second steam chamber 37 through the mold cavity 14 into the first steam chamber 36 and from there exits through the outlet valve 28.

Since the foam particles in the mold cavity 14 represent a flow resistance, steam pressure J rises in the second steam chamber 37, while steam pressure I remains roughly constant at 0 in the first steam chamber 36.

Since the foam particles expand during cross steaming, foam pressure K rises in the mold cavity 14.

The steam flow from the second steam chamber 37 into the mold cavity 14 is measured during the first cross steaming by the gas flow meter 49 as mass flow Q2 (FIG. 8). This mass flow has an exponential fall. The first cross steaming is ended automatically after a predetermined multiple of the time constant T. The multiple is preferably three times the time constant T. It may also be expedient to end cross steaming in the range of two to four times the time constant T of the exponential fall in the mass flow.

Cross Steaming 2 (S13)

For the second cross steaming, the steam inlet valve 25 and the steam outlet valve 28 are closed. Here steam is fed from the steam line 15 through the steam inlet valve 24 into the first steam chamber 36, from where the steam flows through the mold cavity 14 into the second steam chamber 37. From the second steam chamber 37, the steam exits at the steam outlet valve 29. Since, due to the foam particles in the mold cavity 14, the steam flow is subject to resistance, the steam pressure I in the first steam chamber 36 rises, while the steam pressure 3 in the second steam chamber 37 drops to around 0 bar.

Due to the heat input from the steam, the temperature L in the mold cavity 14 rises further, causing the foam particles to expand further and the foam pressure K to rise further.

Exactly like the first cross steaming, the second cross steaming is also terminated automatically after a predetermined multiple of the time constant T of the exponential fall in the mass flow Q1 (FIG. 8).

Autoclaving (S14)

For autoclaving, both steam outlet valves 28, 29 are closed. The two inlet valves 24, 25 are open. As a result, the pressures I, J in the steam chambers 36, 37 rise, to approximately the same value. The foam pressure K remains roughly constant, although the temperature in the mold cavity 14 still rises slightly to around 130° C. The eTPU used here is already fully expanded after the second cross steaming. Another material or another sort of eTPU may expand further during autoclaving and the foam pressure may increase further.

With autoclaving, it is in principle possible, exactly as with cross steaming, to end the duration of autoclaving automatically after a predetermined multiple of the time constant T of the exponential fall in the mass flow Q1 and/or the mass flow Q2 (FIG. 8). Here, however, it may be the case that the exponential fall is not so pronounced as in the case of cross steaming, for which reason another control of the duration of autoclaving may be expedient.

Cooling/Stabilization (S15)

In this embodiment, cooling and stabilization are carried out in one step, since the steam outlet valves 28, 29 are opened in order to run down the existing overpressure, while simultaneously a partial vacuum is applied.

After the pressure in the steam chambers 36, 37 has reduced somewhat, cooling water is sprayed in. The pressures I, J in the first and second steam chambers 36, 37 therefore fall a little. Due to the application of the partial vacuum, moisture and heat are drawn out of the steam chambers and the particle foam part. This reduces the pressures I, J in the first and second steam chambers to a value of −0.5 bar, with 0 corresponding to atmospheric pressure. The partial vacuum is then gradually removed.

The foam pressure K initially remains roughly constant, and then reduces in the mold cavity. The foam pressure K in the mold cavity 14 falls exponentially on account of cooling. Cooling and stabilization are ended automatically after a predetermined multiple of, in particular, three times the time constant T. It may also be sensible to end cooling/stabilization automatically after around two to four times the time of the time constant T of the exponential pressure drop of the foam pressure K has elapsed.

Instead of the exponential pressure decrease K, the exponential fall in temperature L in the mold cavity (FIG. 7) may also be used as the vacuum holding apparatus variable for controlling the duration of cooling/stabilization.

Demolding (S16)

For demolding, the mold and with it the mold cavity 14 are opened. Atmospheric pressure rules in both the steam chambers 36, 37 and also the mold cavity.

In this embodiment, the duration of cross steaming is controlled automatically with the aid of the time constant T. During cross steaming, a partial welding of the foam particles takes place. This reduces porosity and steam permeability. If cross steaming is too short in duration then, in the end product, not all foam particles are adequately welded, and strength is impaired. If on the other hand cross steaming is carried on for too long then it is possible, on the side to which the steam is fed, for the particle foam part to be almost completely welded or "skinned over", thereby impairing the further steam flow in the subsequent steps (second cross steaming, autoclaving). This means that, in the following steps, steam may not be supplied correctly, leading to incorrect welding of the foam particle part. With the automatic control based on the time constant T, the appropriate duration of these process steps occurs automatically and roughly the same porosity after the respective process steps is obtained. This makes it possible to produce particle foam parts of different size or different shape, wherein it is necessary to change only the relevant molds, and no manual setting of the production parameters is required. This makes possible a flexible and rapid production of different particle foam parts.

EXAMPLE 3

The method for controlling an end time point of a sub-step or a step of a production process for a part 48 may also apply to a casting process. A third embodiment for the production of a part 48 by means of casting is explained in detail below (FIG. 9).

In casting, a part 48 in a specific form is obtained from liquid material, preferably molten metal, after solidification.

For example, a reusable mold 3, such as an ingot mold, may be used for casting. The mold 3 or the ingot mold bound a mold cavity 14.

The mold 3 may for example be made of two mold halves 12. Formed in the mold halves 12 are default cooling channels 49 as part of a cooling circuit (not shown). The cooling circuit 49 has a pump (not shown) for supplying the cooling channels with a cooling medium, such as water.

Also provided in the mold halves 12 are temperature sensors 50, for example four, for monitoring the temperature of the mold 3.

According to the method according to the invention, in a first step, the mold cavity 14 of the mold 3 is filled with a material to be solidified, for example molten metal.

This is followed by a stabilization or cooling step in which the mold 3 and thus the part 48 is cooled down via the cooling circuit or the cooling channels 49.

During cooling, the sensors 50 are used to measure the temperatures in various areas of the mold 3. The measured temperatures have an exponential course during cooling. The temperature of the mold 3 represents here the characteristic variable, which is measured to implement the method according to the invention.

With the aid of several consecutive measurements of the temperatures in different areas of the mold halves 12, the time constant of the exponential change is determined.

The stabilization step or the cooling are ended after a period of time corresponding to a predetermined multiple of the time constant.

According to an aspect of the present invention, the temperature is therefore sampled or measured several times, wherein at least three measurements of temperature should be made. Preferably more than three measurements of temperature are taken. With the aid of the measured temperature values and the respective points in time at which the temperature values have been measured, the exponential change in temperature values is determined. From this exponential course, the time constant T may be derived. In the present embodiment, cooling is terminated after the expiry of a period of time corresponding to three times the time constant T. This means that more than 95% of the target temperature of cooling has been reached, without the need to preset an explicit target temperature.

After the cooling step has ended, the mold cavity 14 is demolded and the two mold halves 12 are separated from one another. The finished part 48 may then be removed.

LIST OF REFERENCE NUMBERS 1 apparatus
2 material container
3 mold
4 conveyor pipe
5 base
6 compressed air line
7 compressed air source
8 blowing nozzle
9 compressed air line
10 filling injector
11 compressed air line
12 mold half
13 mold half
14 mold cavity
15 steam line
16 steam line
17 steam generator
18 steam line
19 steam line
20 steam line
21 steam line
22 connection point
23 slide
24 steam inlet valve
25 steam inlet valve
28 steam outlet valve
29 steam outlet valve
33 mold cavity wall
34 mold cavity wall
35 steam nozzle
36 steam chamber
37 steam chamber
38 wall
39 steam inflow passage
40 steam outflow passage
41 nozzle
42 housing
43 nozzle tube
44 quill
45 closing pin
46 pneumatic piston
47 opening
48 part
49 cooling channels
50 temperature sensors

The invention claimed is:

1. A method of controlling a process automatically carried out by a machine, comprising:
   filling of a mold cavity with a material,
      with a sensor, measuring a variable characteristic for a step and with an exponential change, wherein the step is at least one of a stabilization step, steaming step, cross steaming step, welding step, cooling step, autoclaving step, secondary steaming step, or expansion step,
      after several consecutive measurements of the characteristic variable with the sensor, determining a time constant of the exponential change, and the step is ended when it has been carried out for a period of time corresponding to a multiple of 2-4 of the time constant, and
   demolding of the mold cavity.

2. The method according to claim 1, wherein in the stabilization step, cooling of the mold, follows filling of the mold cavity with the material, wherein during the stabilization step the mold and/or a part is or are cooled by the feeding of cooling water or cooling air into cooling channels formed in the mold.

3. The method according to claim 2, wherein the characteristic variable of the stabilization step is the temperature in the mold cavity or the temperature of the mold.

4. The method according to claim 1 for the production of particle foam parts, wherein:
   the filling of the mold cavity with the material includes filling the mold cavity with foam particles;
   the foam particles are welded into a particle foam part; and
   the mold cavity is opened and the particle foam part is removed during the demolding of the mold cavity.

5. The method according to claim 4, wherein the characteristic variable is pressure and/or temperature.

6. The method according to claim 4, wherein
   during welding, firstly heat is fed to the foam particles and then the foam particles are cooled down during the cooling step in the stabilization step, and
   the characteristic variable of the stabilization step is the pressure or the temperature in the mold cavity.

7. The method according to claim 6, wherein during the stabilization step, the mold and/or the particle foam part are exposed to water or air.

8. The method according to claim 4, wherein during welding, cross steaming is carried out, in which steam is fed to the foam particles, wherein the characteristic variable of the cross steaming is the steam consumption or the temperature in the mold cavity.

9. The method for the production of particle foam parts, according to claim 4, wherein:
   in the filling of the mold cavity with the foam particles, the foam particles are taken from a material container and fed to the mold cavity via a pipe, wherein the foam particles in the pipe are conveyed by means of filling air.

10. The method for the production of particle foam parts, according to claim 4, wherein:
   the mold cavity is bounded by two mold parts;
   in the welding of foam particles into the particle foam part, steam is fed to the foam particles in the steaming step; and
   in the demolding of the mold cavity, the mold cavity is opened and the particle foam part removed;
   at the start of the feeding of steam into the mold cavity, the mold parts are a short distance apart, and then the two mold parts are moved together, causing the foam particles to be compressed, wherein two mold parts are used which are sealed with one another even when spaced apart.

11. The method for the production of particle foam parts, according to claim 4, wherein during a cycle, at regular intervals, measured parameters including temperature and/or pressure in the mold cavity, pressure and/or temperature and/or flow volume of steam or condensate supplied or removed, valve settings, flow volume of compressed air used in filling, are recorded; and with the aid of the recorded measured parameters, one or more predetermined setting parameters within this cycle are set.

12. The method according to claim 11, wherein the measured parameters are recorded at intervals of no longer than 10 seconds.

13. The method according to claim 4, wherein the welding of the foam particles includes the following steps:
- rinsing with steam of steam chambers which are located adjacent to the mold cavity, causing air present in the steam chambers to be displaced;
- the cross steaming step includes cross steaming of the mold cavity, wherein the cross steaming may be divided into at least two sub-steps, in which the steam flows through the mold cavity in respectively opposite directions in the steaming step and the secondary steaming step; and
- the autoclaving step includes autoclaving of the foam particles, wherein they are pressurized by steam.

14. The method according to claim 4, wherein after welding and before demolding of the foam particles, the particle foam part is stabilized in the stabilization step, in which
- water is sprayed into the mold cavity, and/or
- partial vacuum is applied to the mold cavity, and/or
- the particle foam part is temporarily compressed by means of compressed air, and/or
- the particle foam part is retained in the mold cavity for a predetermined period of time.

15. The method according to claim 4, wherein after demolding, a mold bounding the mold cavity, and/or a quill located in a filling injector are cleaned by passing compressed air through them.

16. The method according to claim 4, wherein a steam flow of the steam flowing through the mold cavity in the steaming step is determined as a measured parameter, wherein this steam flow is determined with the aid of steam pressure and steam temperature at an inlet valve of a steam chamber adjoining the mold cavity, and with steam pressure, steam temperature and condensate volume at an outlet valve of another steam chamber adjoining the mold cavity.

17. The method according to claim 4, wherein during filling, the pressure in a material feed pipe is measured, and the filling process is ended once a certain pressure has been reached.

18. The method according to claim 4, wherein foam particles are used which are made of expanded polyurethane (eTPU), expanded polypropylene (ePP), expanded polyethylene, expanded polystyrol (ePS), PLA (polylactic acid), PEBA (polyether-block-amide) and/or polyimide.

19. The method for the production of particle foam parts, according to claim 4,
- wherein filling, welding, and demolding are repeated cyclically, in order to produce in each case at least one particle foam part;
- wherein a mold with a heating device bounding the mold cavity is set at a predetermined temperature between each cyclical repetition.

20. The method for the production of particle foam parts, according to claim 4, wherein one or more measured parameters is or are measured on the demolded particle foam part; and with the aid of the recorded measured parameters, one or more predetermined setting parameters is or are set.

21. The method for the production of particle foam parts, according to claim 4, wherein after welding of the foam particles and before demolding of the particle foam part, a process medium including compressed air or steam is fed through the mold cavity and a flow volume of the process medium is measured, so that the porosity of the particle foam part may be assessed on the basis of the flow volume.

22. The method according to claim 1, further comprising a heating step.

23. A method of controlling production of particle foam parts, comprising:
- filling of a mold cavity with foam particles;
- welding of the foam particles into a particle foam part while cross steaming, in which steam is fed to the foam particles;
- during cross steaming, making several measurements of a characteristic variable of the cross steaming, the characteristic variable being steam consumption or the steam or temperature in the mold cavity;
- determining a time constant of exponential change of the characteristic variable and ending cross steaming when a period of time corresponding to a multiple of 2-4 of the time constant has been completed; and
- demolding of the mold cavity, wherein the mold cavity is opened and the particle foam part removed.

24. A method of controlling a process automatically carried out by a machine, comprising:
- filling of a mold cavity with a material;
- with a sensor, measuring a variable characteristic for a welding step, the variable having an exponential change;
- after several consecutive measurements of the characteristic variable with the sensor, determining a time constant of the exponential change, and the welding step is ended when it has been carried out for a period of time corresponding to a multiple of 2-4 of the time constant, and
- demolding of the mold cavity.

25. The method according to claim 24, wherein the characteristic variable is pressure and/or temperature.

* * * * *